United States Patent
Facer et al.

(10) Patent No.: US 12,472,499 B2
(45) Date of Patent: Nov. 18, 2025

(54) PARTICLE SEPARATOR SYSTEM, MATERIALS, AND METHODS OF USE

(71) Applicant: LEVITASBIO, INC., Menlo Park, CA (US)

(72) Inventors: Geoffrey Facer, Redwood City, CA (US); Theodorus Evan de Groot, Oakland, CA (US); Kevin Travers, Menlo Park, CA (US); Lesley Suzanne Weaver, Palo Alto, CA (US)

(73) Assignee: LEVITASBIO, INC., Menlo Park, CA (US)

( * ) Notice: Subject to any disclaimer, the term of this patent is extended or adjusted under 35 U.S.C. 154(b) by 28 days.

(21) Appl. No.: 17/449,438

(22) Filed: Sep. 29, 2021

(65) Prior Publication Data
US 2022/0097062 A1    Mar. 31, 2022

Related U.S. Application Data

(60) Provisional application No. 63/086,033, filed on Sep. 30, 2020.

(51) Int. Cl.
| | | |
|---|---|---|
| *B01L 3/00* | (2006.01) | |
| *G01N 15/06* | (2024.01) | |
| *G01N 15/075* | (2024.01) | |

(52) U.S. Cl.
CPC ... *B01L 3/502753* (2013.01); *B01L 3/502715* (2013.01); *B01L 3/502746* (2013.01); *B01L 3/502761* (2013.01); *G01N 15/0656* (2013.01); *B01L 2200/0652* (2013.01); *B01L 2300/0663* (2013.01); *B01L 2300/0864* (2013.01); *B01L 2300/0883* (2013.01); *B01L 2400/043* (2013.01); *G01N 15/075* (2024.01)

(58) Field of Classification Search
None
See application file for complete search history.

(56) References Cited

U.S. PATENT DOCUMENTS

| | | |
|---|---|---|
| 5,980,479 A | 11/1999 | Kutushov et al. |
| 6,432,630 B1 | 8/2002 | Blankenstein et al. |
| 8,689,981 B2 | 4/2014 | Stone et al. |
| 9,517,474 B2 | 12/2016 | Mao et al. |

(Continued)

FOREIGN PATENT DOCUMENTS

| | | |
|---|---|---|
| WO | 98/10267 A1 | 3/1998 |
| WO | WO-2010/121294 A1 | 10/2010 |

(Continued)

OTHER PUBLICATIONS

Amin et al., "Proteomic Profiling of Cardiac Tissue by Isolation of Nuclei Tagged in Specific Cell Types (INTACT)," Development, vol. 141, No. 4, p. 962-973, (2014).

(Continued)

*Primary Examiner* — Kathryn Elizabeth Limbaugh
(74) *Attorney, Agent, or Firm* — Hoxie & Associates LLC

(57) ABSTRACT

The present invention relates generally to systems, materials, and methods utilizing magnetic levitation to affect separation and/or concentration of particulate containing samples, such as cells or biomolecules, within a medium. In some embodiments, the methods are used for the separation of a mixture of live cells and dead cells, and to isolate particle depleted medium.

25 Claims, 25 Drawing Sheets

(56) References Cited

U.S. PATENT DOCUMENTS

| | | |
|---|---|---|
| 9,873,126 B2 | 1/2018 | Mao et al. |
| 11,338,290 B2 | 5/2022 | Baday et al. |
| 2002/0187072 A1 | 12/2002 | Karp et al. |
| 2003/0095897 A1 | 5/2003 | Grate et al. |
| 2004/0009614 A1 | 1/2004 | Ahn et al. |
| 2008/0074449 A1 | 3/2008 | Lee et al. |
| 2009/0047297 A1* | 2/2009 | Kim .................. B03C 1/288 210/695 |
| 2010/0285606 A1 | 11/2010 | Phillips et al. |
| 2011/0201125 A1 | 8/2011 | Zahn et al. |
| 2012/0080360 A1 | 4/2012 | Stone et al. |
| 2012/0115738 A1 | 5/2012 | Zhou et al. |
| 2012/0122731 A1 | 5/2012 | Soh et al. |
| 2013/0130226 A1 | 5/2013 | Lim et al. |
| 2013/0133419 A1 | 5/2013 | Whitesides et al. |
| 2013/0306566 A1 | 11/2013 | Mao et al. |
| 2013/0337576 A1 | 12/2013 | Zhu et al. |
| 2014/0220617 A1* | 8/2014 | Yung ................ B01L 3/502761 210/695 |
| 2014/0248618 A1 | 9/2014 | Shaikh et al. |
| 2014/0342373 A1 | 11/2014 | Viovy et al. |
| 2014/0370519 A1 | 12/2014 | Vangbo et al. |
| 2016/0244714 A1 | 8/2016 | Spuhler et al. |
| 2016/0263574 A1* | 9/2016 | Smith ............... B01L 3/502761 |
| 2016/0370386 A1 | 12/2016 | Demirci et al. |
| 2017/0333914 A1 | 11/2017 | Kang et al. |
| 2018/0001324 A1 | 1/2018 | Khashan et al. |
| 2018/0280977 A1* | 10/2018 | Baday ................ G01N 33/574 |
| 2020/0025669 A1* | 1/2020 | Ward ................ G01N 33/6893 |
| 2021/0146365 A1 | 5/2021 | Stephenson et al. |
| 2021/0260577 A1 | 8/2021 | Facer et al. |
| 2022/0161260 A1 | 5/2022 | Facer et al. |
| 2022/0323957 A1 | 10/2022 | Brodie et al. |
| 2022/0323960 A1 | 10/2022 | Baday et al. |

FOREIGN PATENT DOCUMENTS

| | | |
|---|---|---|
| WO | WO 2012/135834 A2 | 10/2012 |
| WO | WO-2018/102471 A1 | 6/2018 |
| WO | 2018/213643 A1 | 11/2018 |
| WO | WO 2019/191137 A1 | 10/2019 |
| WO | 2022118894 A1 | 6/2022 |
| WO | 2024192169 A1 | 9/2024 |

OTHER PUBLICATIONS

Ogawa et al., "Methods to Separate Nuclear Soluble Fractions Reflecting Localizations in Living Cells," ISCIENCE, vol. 24, No. 7, 20 pages (2021).

"What is Ferrofluid," 6 pages, (2024); Retrieved from https://ferrofluid.com/ on Jun. 30, 2024.

Abrahamsson et al., "Analysis of Powders Containing Illicit Drugs Using Magnetic Levitation," Angew. Chem. Int. Ed., vol. 59, p. 874-881, (2020).

Esmaeili et al., "Hybrid Magnetic-DNA Directed Immobilisation Approach for Efficient Protein Capture and Detection on Microfluidic Platforms," Scientific Reports, vol. 7, No. 194, 11 pages (2017).

Ge et al., "High-Throughput Density Measurement Using Magnetic Levitation," J Am Chem Soc., vol. 140, No. 24, p. 7510-7518, (2018); Abstract Only.

PCT/US2019/024138 International Search Report and Written Opinion dated Jul. 19, 2019.

Wilbanks et al., "Exploiting Magnetic Asymmetry to Concentrate Diamagnetic Particles in Ferrofluid Microflows," Journal of Applied Physics, vol. 115, No. 044907, 7 pages, (2014); Abstract Only.

* cited by examiner

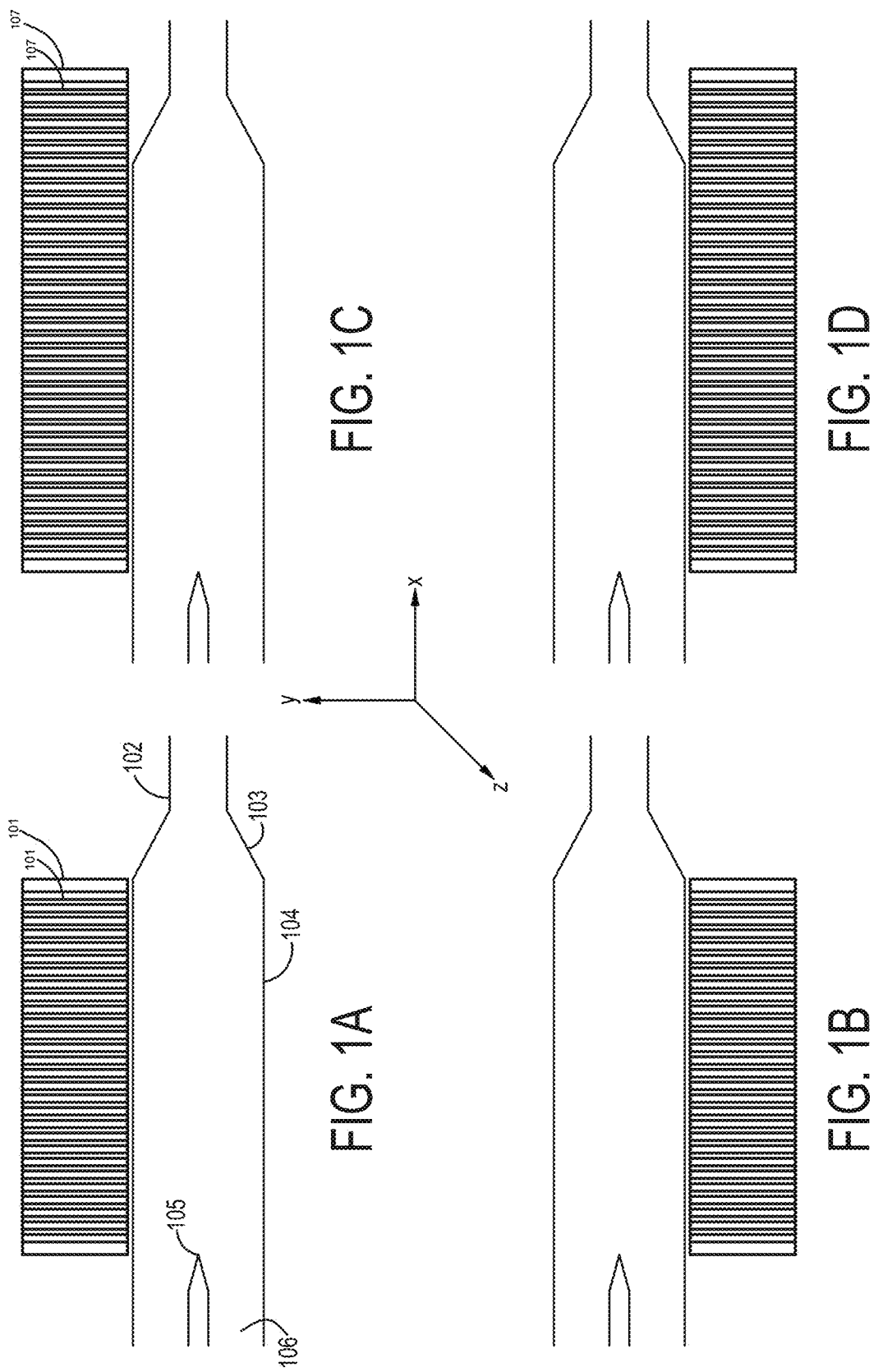

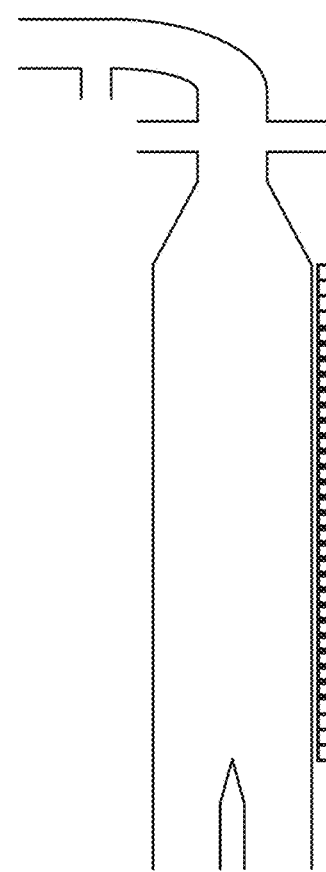
FIG. 2A
FIG. 2C
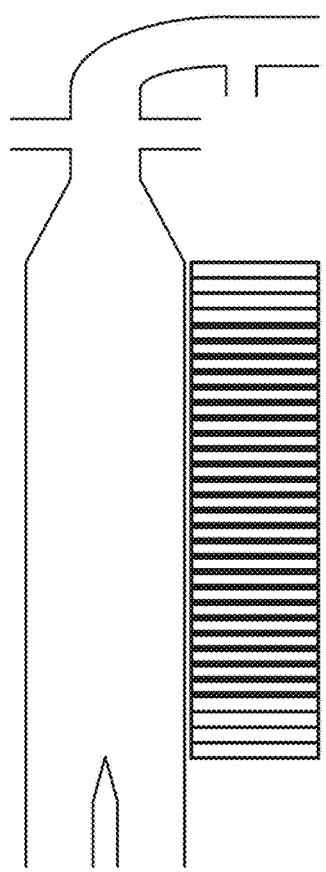
FIG. 2B
FIG. 2D

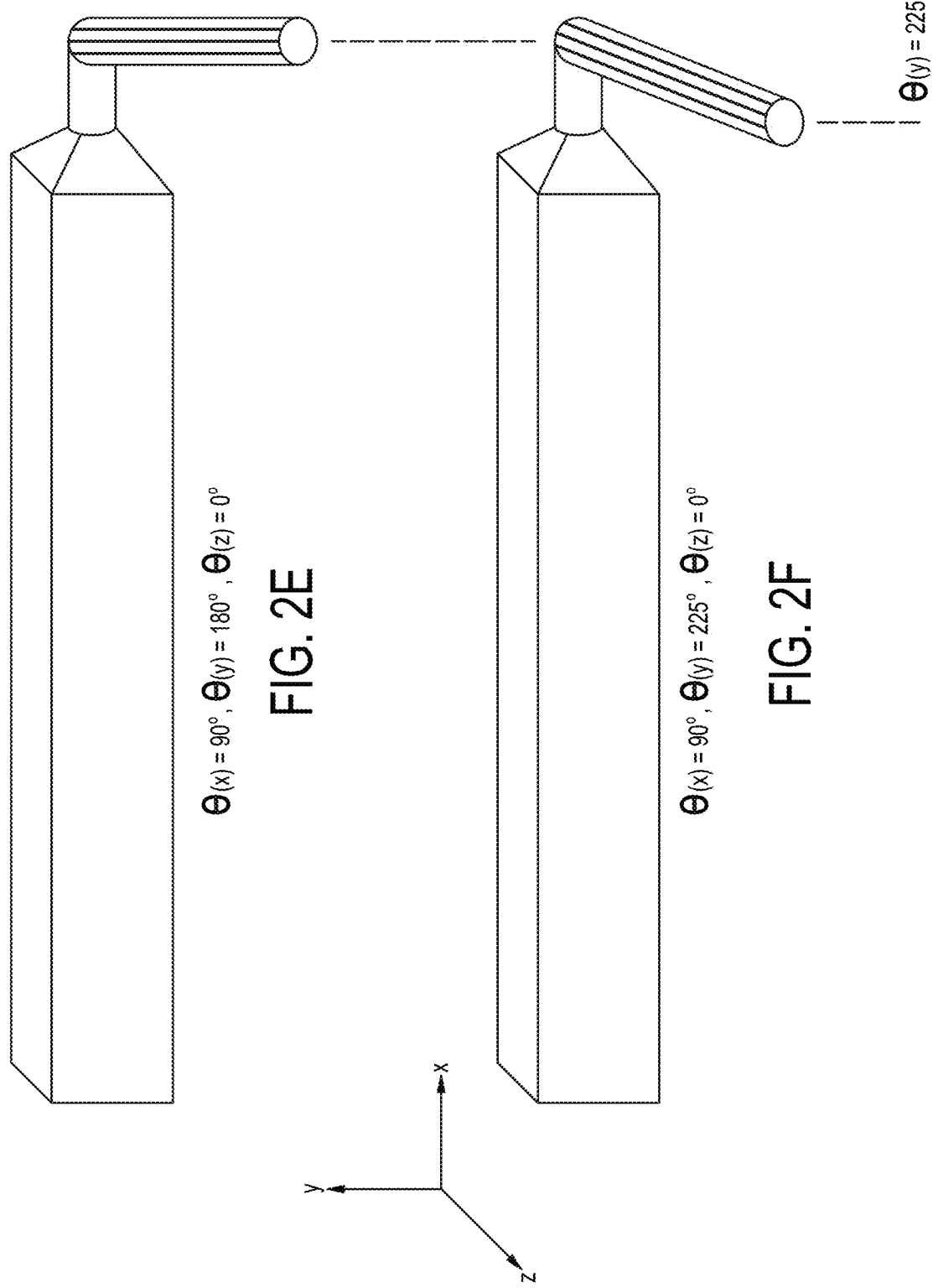

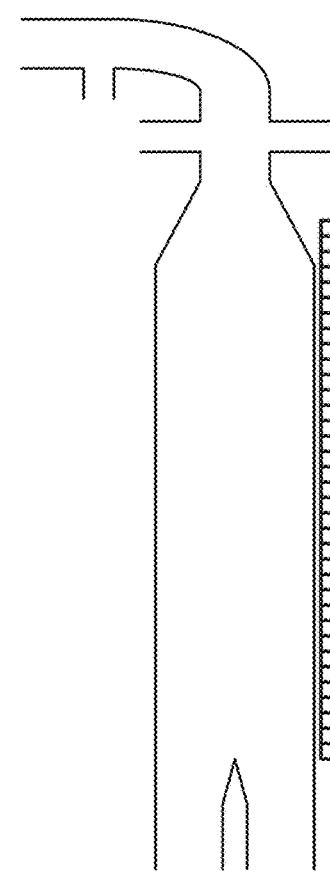
FIG. 3A
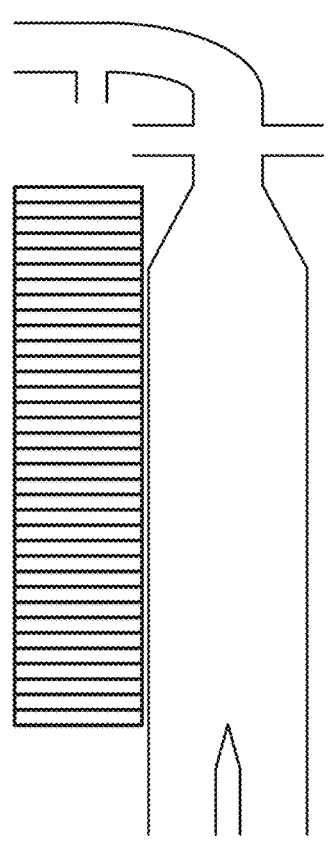
FIG. 3C
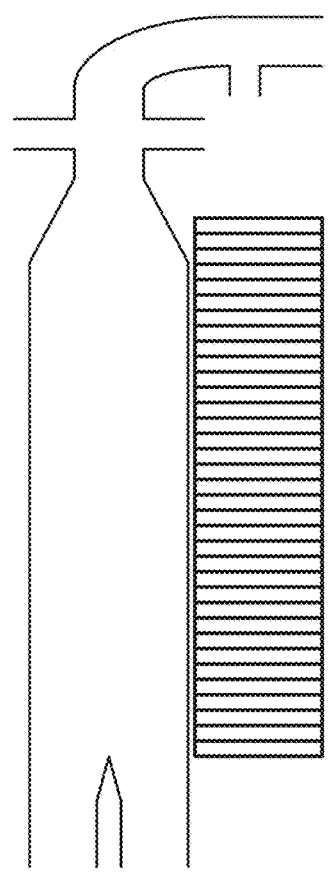
FIG. 3B
FIG. 3D

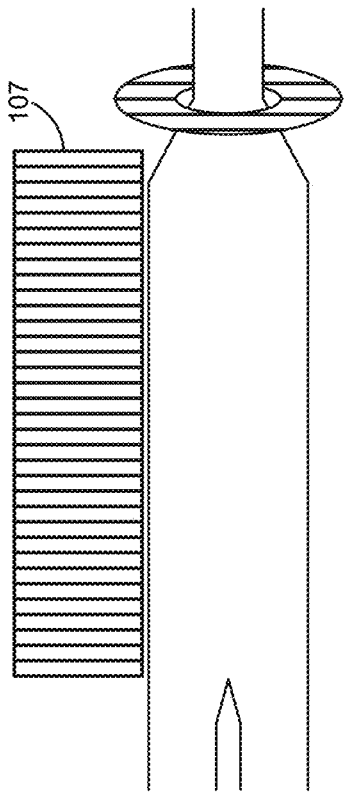
FIG. 4A
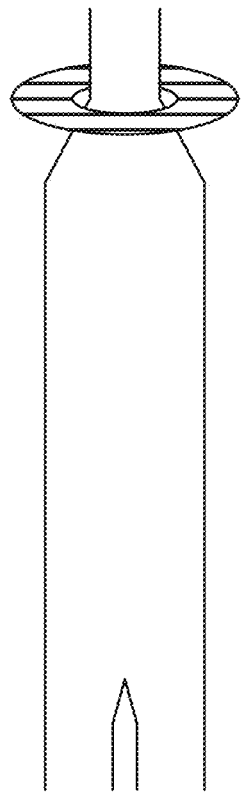
FIG. 4B
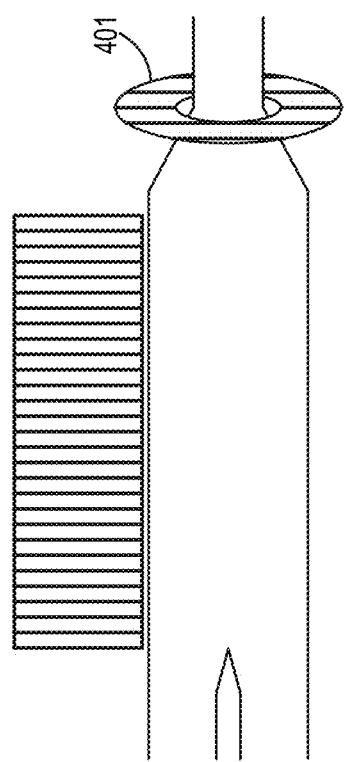
FIG. 4C
FIG. 4D
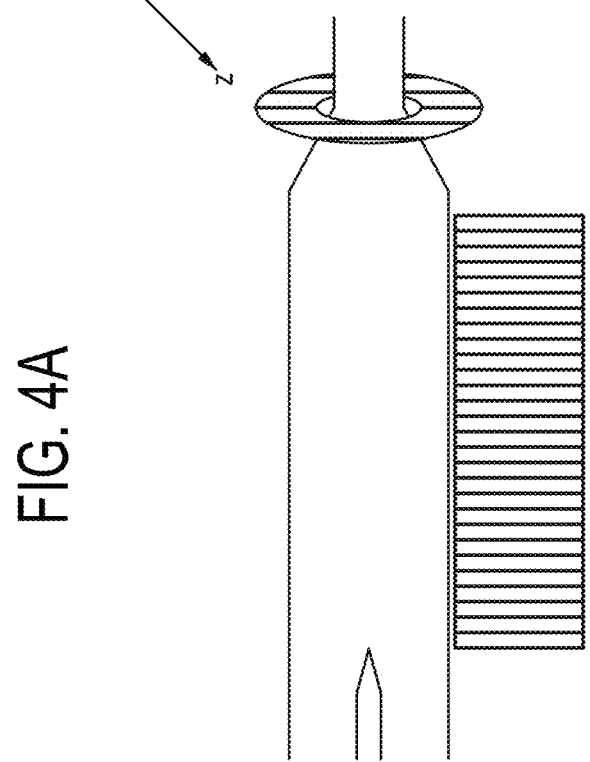

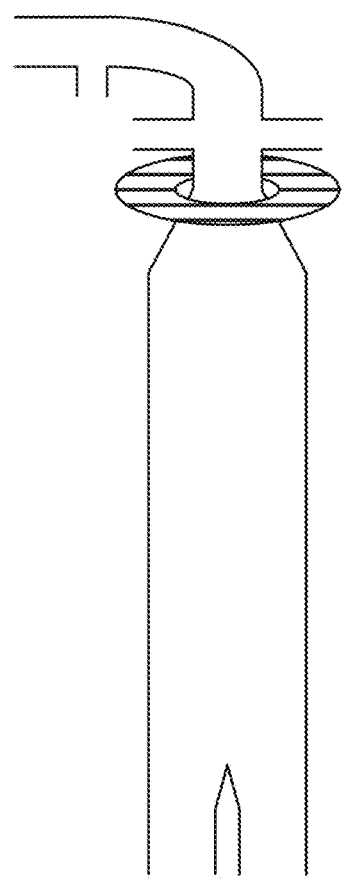
FIG. 8A
FIG. 8C
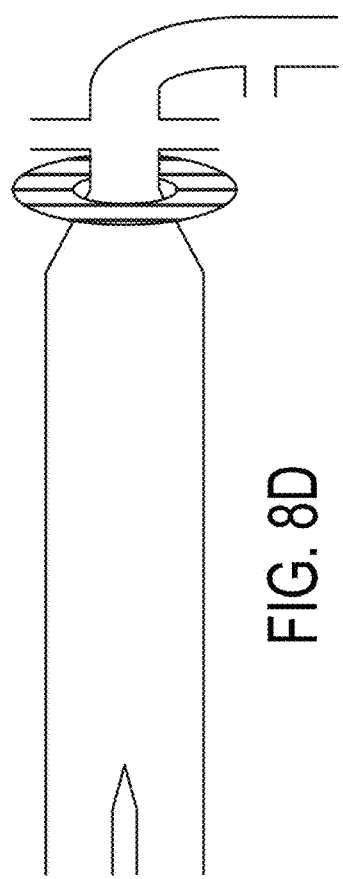
FIG. 8B
FIG. 8D
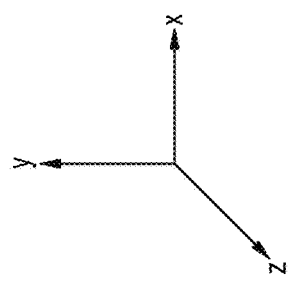

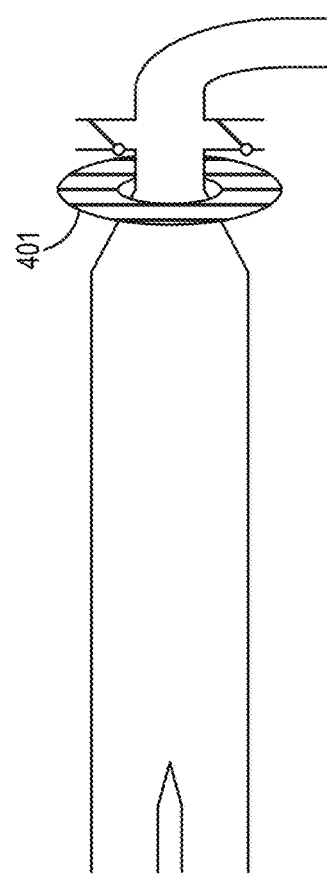
FIG. 8G
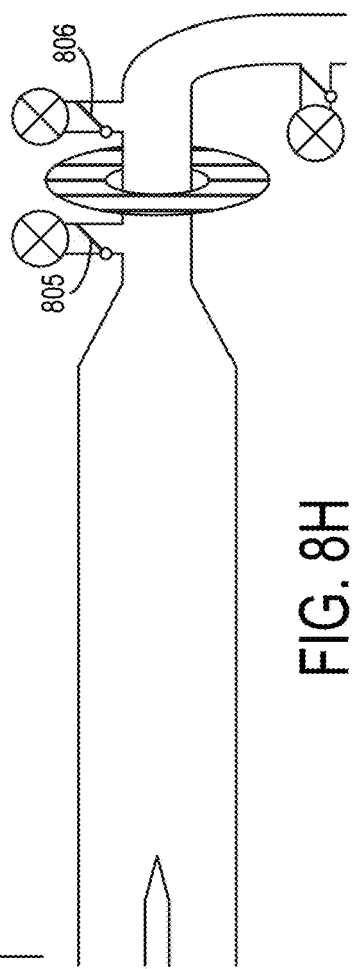
FIG. 8H
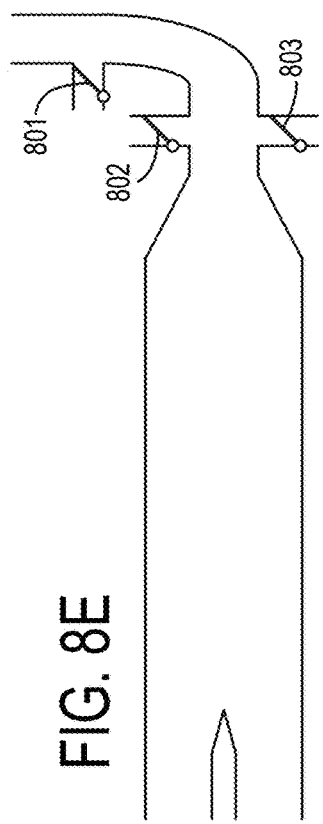
FIG. 8E
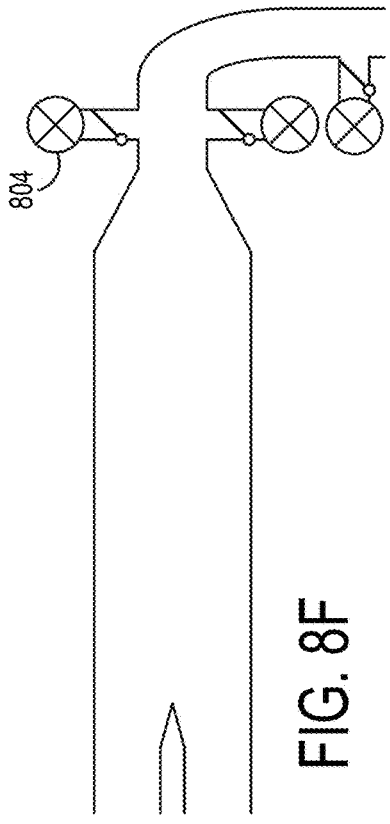
FIG. 8F
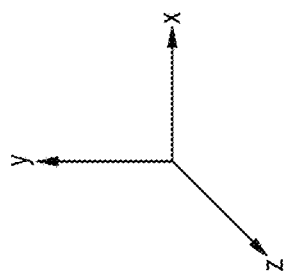

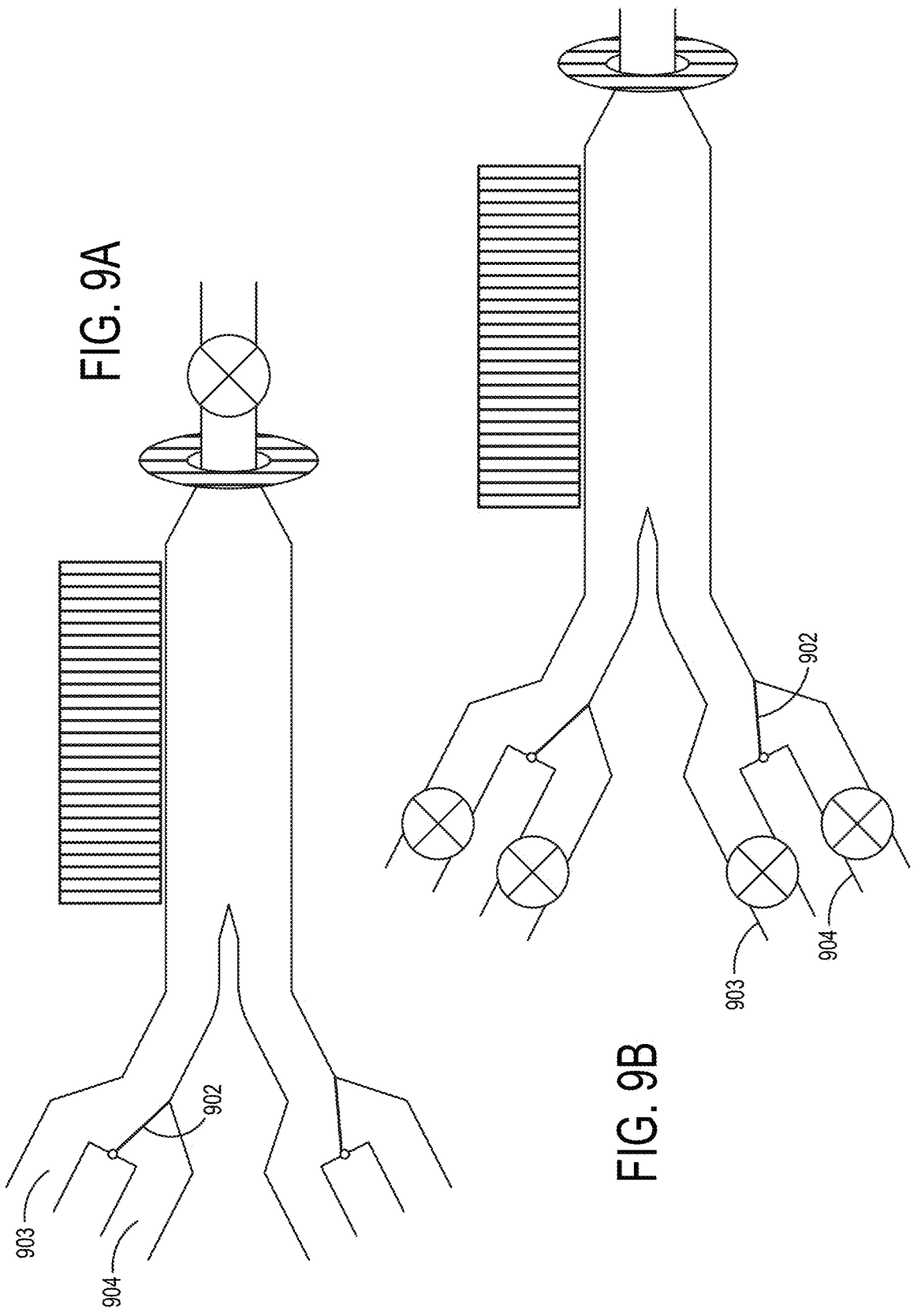

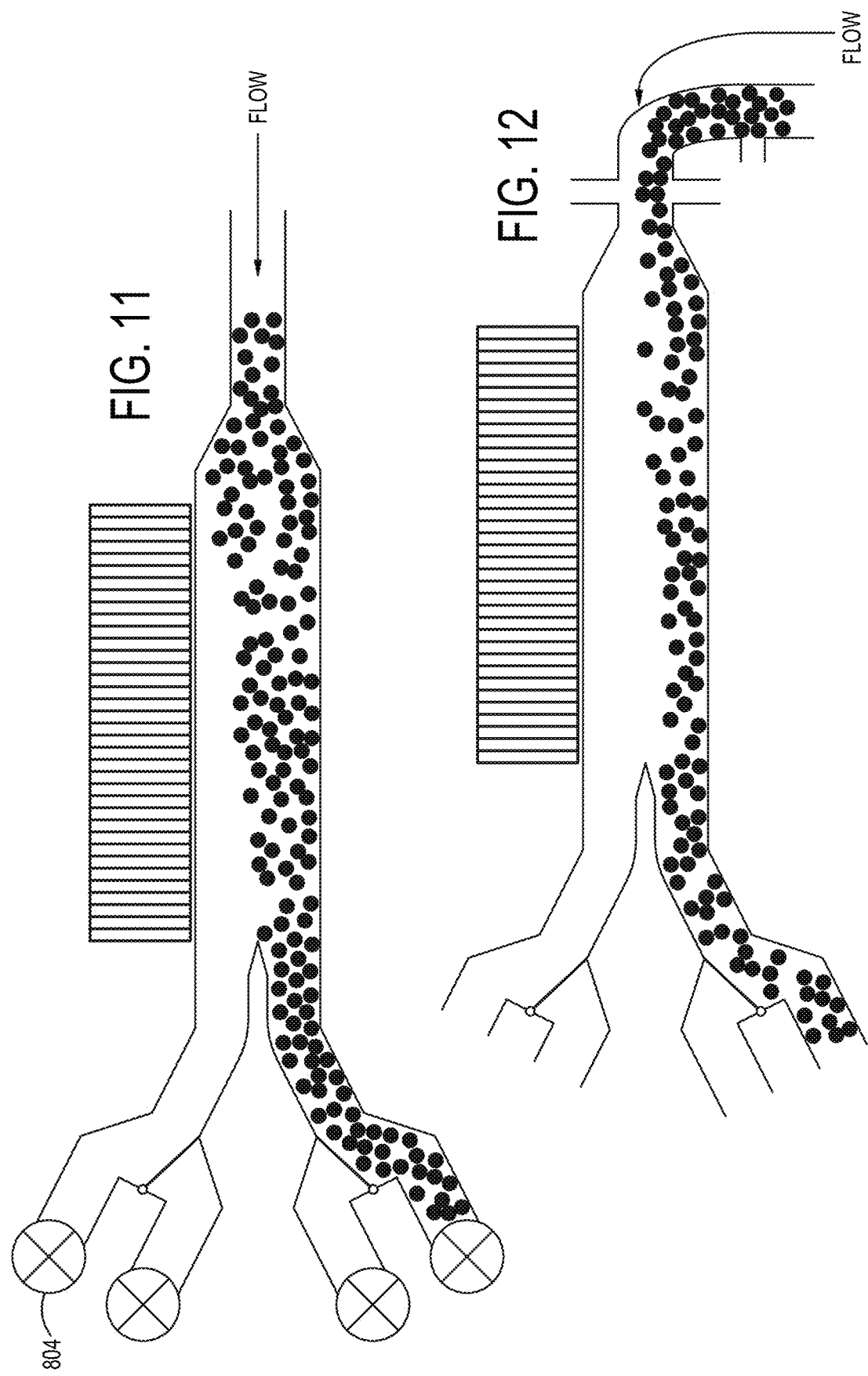

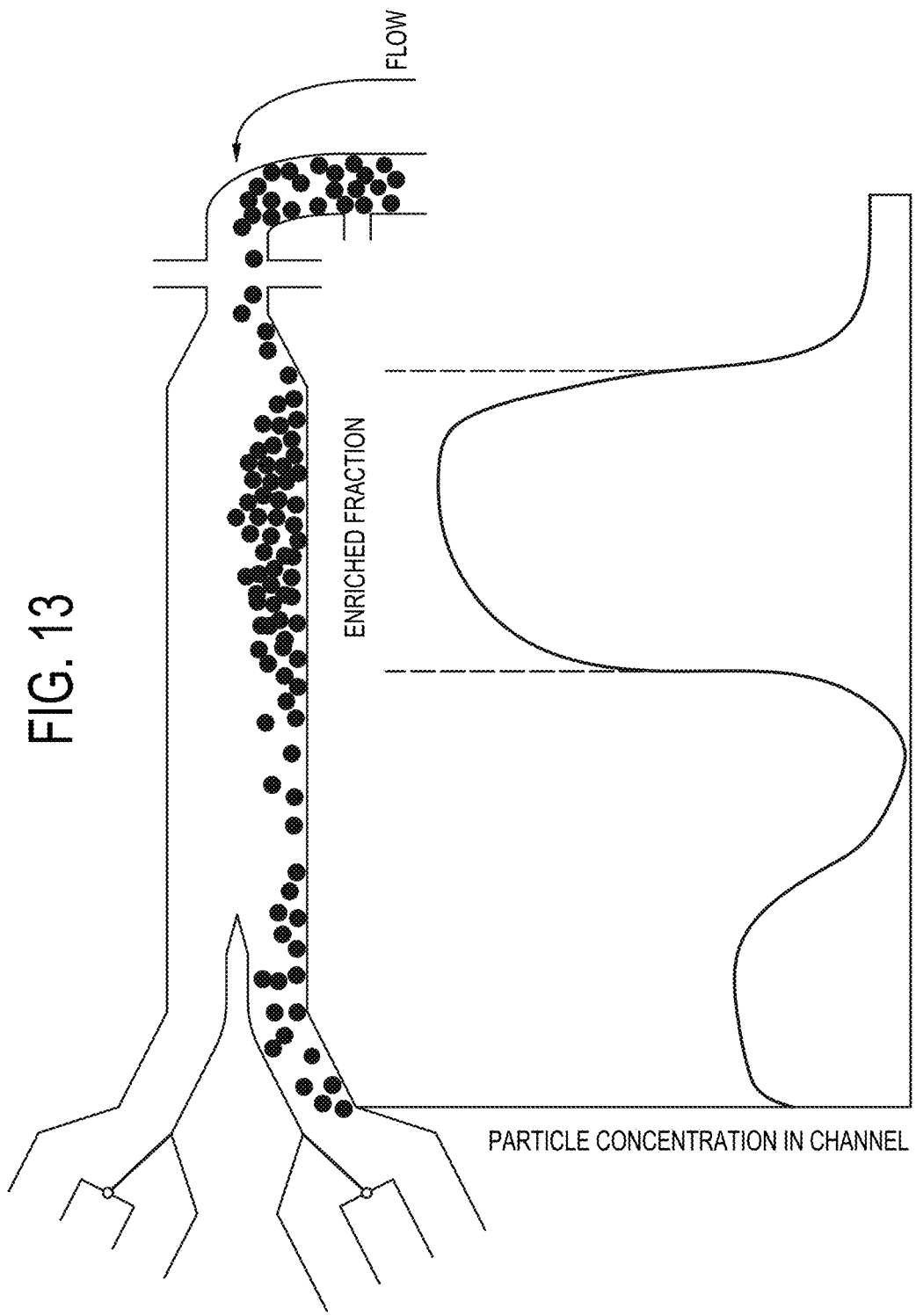

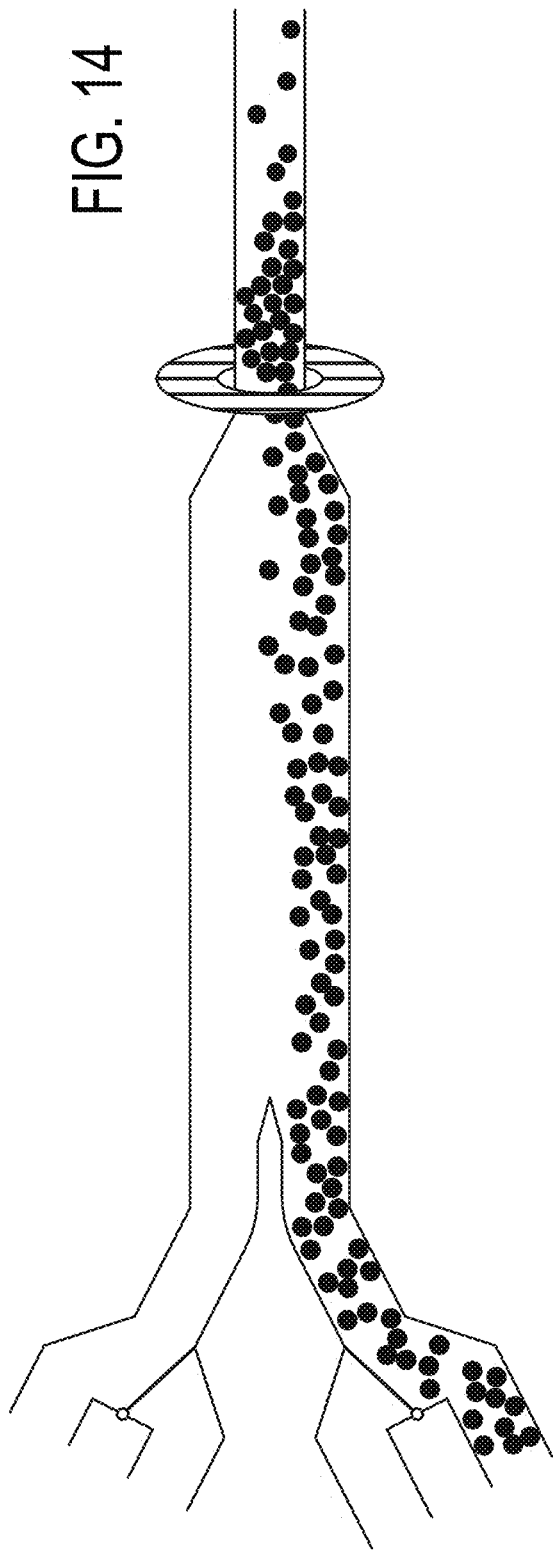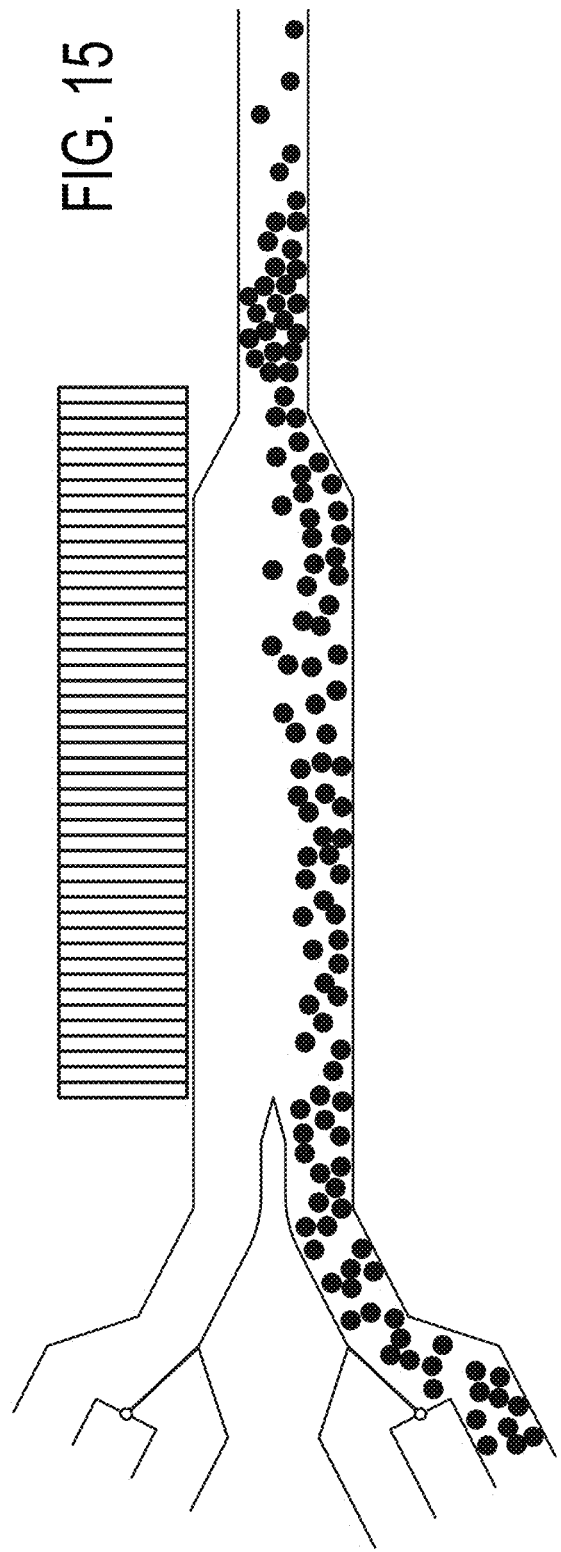

PARTICLE SEPARATOR SYSTEM, MATERIALS, AND METHODS OF USE

CROSS-REFERENCE TO RELATED APPLICATIONS

This application claims priority benefit of U.S. Provisional Application Ser. No. 63/086,033, filed Sep. 30, 2020, the content of which is incorporated herein by reference in its entirety.

TECHNICAL FIELD OF THE INVENTION

The present invention relates generally to the concentration of particulate containing samples, such as cells or biomolecules, in order to isolate such particles within a medium and to isolate particle depleted medium.

BACKGROUND OF THE INVENTION

Isolation of particles contained within a medium is an important step in many chemical and biological processes. In some processes there may be a need to simply isolate a particle to facilitate the use or manipulation of the particle, whereas in other processes there may be a need to separate the particle from other particles that are also present in the medium. Various devices have been developed to facilitate such particle isolation and separation. In addition, there have been attempts to develop devices that rely on the magnetic properties of the particles and their surrounding medium in order to separate out particles of interest from heterogenous populations of particles.

A common need when working with cells is to concentrate the cells by reducing the volume that the cells are suspended in. The most common procedure for cell concentration is to centrifuge the cells to form a pellet and removing a large portion of the media. Centrifugation involves the application of centrifugal force to separate particles from a solution according to their size, shape, density, viscosity of the medium, and rotor speed. However, there are instances in which centrifugation is undesirable, where centrifugation can create damage to the cells or activate the cells. For example, centrifugation with T cells can lead to activation of the cells. Additionally, when working with rare or low volume samples, bulk separation techniques such as centrifugation can be extraordinarily wasteful or laborious and do not easily allow for fractionation of the sample. Also, when the particles to be separated are fragile or labile, such as when working with biological entities, precise conditions to enhance particle stability can be challenging.

The devices and methods described herein address these issues by providing alternative methods for concentrating particles and producing particle-depleted medium that does not depend on the high mechanical forces that are required during centrifugation.

SUMMARY OF THE INVENTION

The inventive embodiments provided in this Summary of the Invention are meant to be illustrative only and to provide an overview of selected embodiments disclosed herein. The Summary of the Invention, being illustrative and selective, does not limit the scope of any claim, does not provide the entire scope of inventive embodiments disclosed or contemplated herein, and should not be construed as limiting or constraining the scope of this disclosure or any claimed inventive embodiment.

Provided herein is a fluidic concentrator device that includes an inlet channel, a processing channel, and at least two output channels, and a pump for movement of a particle containing sample through the concentrator device. The concentrator device may have separate diversion channels that may be controlled by a valve or a functionally similar diversion technique to collect all of, or fractions of, a particle concentrated stream or a particle depleted stream. The concentrator device may be operable under automated control and further comprise one or more sensors inside, or adjacent to, portions of the processing channel or inlet channel to detect presence or absence or quantity of particles or other physical or chemical properties of the particles or sample flow stream. The output of the detectors may be operably-linked to concentrator controls to optimize concentration and fractionation conditions. Particle concentration/depletion may be physically accomplished by the device through gravitational sedimentation, magnetic levitation/repulsion, and a combination thereof. The interface of the inlet channel to the processing channel is preferably geometrically configured to reduce or eliminate turbulent flow in the processing channel. The interface between the processing channel and the output channels is preferably geometrically configured to facilitate collection of layered streams, a particle enriched stream and a particle depleted stream into their respective outlet channels.

Also provided herein is a fluidic concentrating device with a magnetic component positioned substantially linear along the processing channel (X-axis) to provide magnetic repulsion or attraction of the particles in the processing channel based upon their paramagnetic properties. The magnetic component may function to induce or augment sedimentation of the particles within the processing channel. An additional application of the fluidic concentrating device comprising a magnet component along the processing channel is the ability of such device to be operable in low- or micro-gravity environments. Alternatively, in some cases, the magnetic component may selectively inhibit sedimentation of certain particles in a sample fluid when the sample fluid is a heterogeneous particle mixture. Providing a magnetic field within the inlet channel may, in some embodiments, impart a preconcentrating effect by providing a surmountable inhibition of particle flow from the inlet channel into the processing channel. The inlet channel magnetic field can be induced extending a magnet that is substantially linear along the processing channel into the inlet channel. Alternatively, a magnetic component may independent of the processing channel and placed in magnetic communication with the inlet channel. In one embodiment, this is a bar magnet, in another embodiment it is an annular or toroidal magnet surrounding all or a portion of the inlet channel. The inlet channel magnets may be permanent magnets or electromagnets under control of a magnetic controller. In further embodiments exemplified below, the processing channel may have a plurality of magnetic components placed substantially linear to the processing channel. In one such embodiment, magnets providing dissimilar magnetic field strength are positioned opposite each other (e.g. top and bottom) in a substantially linear fashion parallel to the processing channel. When combined with a preconcentration step or device configuration, this embodiment can act selectively to concentrate a predetermined particle component of a sample contain a heterogeneous particle composition. The accumulation of the particles outside the processing channel can be a passive process that is dependent on sample flowrate and the mobility of the particles in the sample liquid medium within the inlet channel. The accumulation of the particles outside the processing channel can be an active process utilizing a magnetic field within the inlet channel to impede particle within the field. The impediment of particle movement from the inlet channel into the processing channel can be overcome by manipulation of flowrate or flow pattern. For example, increasing particle mobility in the inlet channel through increase in flowrate or the introduction of one or more pulses of increased channel pressure. When particle inhibition is accomplished by electromagnetic field induction in the inlet channel, particle mobility from the inlet channel into the processing channel can be increased by reduction of the inlet channel magnetic field, modification of inlet channel flow rate or pressure, or a combination of magnetic field and sample flow properties.

Further provided herein is a particle-concentrating device comprising a fluidic processing channel structure, at least one magnetic component, and at least two output ports, wherein the fluidic processing channel includes a substantially linear portion having a leading end that is in fluidic communication with the input port and a tail end that is in fluidic communication with the output ports. The at least two output ports are substantially configured in parallel. In accordance with this embodiment, each of the output ports comprises at least one collection pathway, wherein the collection pathway leads to a collection chamber containing a determined quantity of a material required for a subsequent processing step. The fluidic channel structure is typically a micro-capillary channel, wherein particles are allowed to flow through freely or at a desired rate. The device may further comprise one or more pumps configured to drive fluid from an input port through the fluidic channel structure. In some embodiments, the device further comprises one or more valves for controlling the particle pathway and/or flow rate.

Sample Concentration Embodiments

Embodiments of the methods of the present invention are further described in the numbered embodiments below. The numbered embodiments are non-limiting of the invention and may incorporate further elements and alternatives described herein.

A first embodiment (1) is a method of concentrating a sample comprising, (i) providing a low volume fluidic device with a processing channel, an inlet channel, and a plurality of outlet channels, (ii) flowing a particle containing sample through the inlet channel into the processing channel under conditions to produce a sample flow stream with at least a particle enriched layer and a particle depleted layer, (iii) flowing the particle enriched layer through a first outlet channel to produce a particle enriched flow stream, (iv) flowing the particle depleted layer through a second outlet channel to produce a particle depleted flow stream, and (v) collecting one or more of the flow streams from one or more of the outlet channels.

A second embodiment (2) is the first embodiment further comprising subjecting the particle containing sample to flow conditions sufficient to induce sedimentation of the sample particles into the particle enriched flow stream. A third embodiment (3) is the first embodiment (1) further comprising providing a magnetic field from the top of the processing channel and aligned with the X-axis of the processing channel and repelling particles in the sample into particle enriched flow stream. A fourth embodiment (4) is embodiment three or four further comprising (i) inducing a magnetic field within the inlet channel to impede the movement of particles from the inlet channel into the processing channel to form a particle concentrated portion of the sample flow stream in the inlet channel, (ii) moving the particle concentrated portion of the sample flow stream into the processing channel, (iii) producing a particle enriched flow stream, (iv) flowing the particle enriched flow stream through an outlet channel, and (v) capturing the particle enriched flow stream.

A fifth embodiment (5) is method of the embodiments of two or three (2-3) further comprising (i) inducing a magnetic field within the inlet channel to impede the movement of particles from the inlet channel into the processing channel to form a particle concentrated segment of the sample flow stream in the inlet channel, (ii) moving the unimpeded portion of the sample flow stream into the processing channel, (iii) producing a particle depleted flow stream, (iv) flowing the particle depleted flow stream through an outlet channel, and (v) capturing the particle depleted flow stream.

A sixth embodiment (6) is an embodiment of one through four (1-4) further comprising measuring the particles in the particle enriched layer in the processing channel to determine a relative particle concentration or position, and collecting a fraction of the particle enriched layer based on a high relative particle concentration or position of particles in the processing channel. A seventh embodiment (7) is the embodiments of one through three (1-3) or embodiment five (5) further comprising measuring the particles in the particle depleted layer in the processing channel to determine a relative particle concentration, and collecting a fraction of the particle depleted layer based on a low relative particle concentration.

An eight embodiment (8) is embodiment five (5) further comprising providing the magnetic field within the inlet channel that is continuous with a magnetic field produced from the top of the processing channel and aligned along the X-axis of the processing channel. A ninth embodiment (9) is embodiment five (5) further comprising producing a toroidal magnetic field surrounding the inlet channel. A tenth embodiment (10) is the method of embodiment nine (9) further comprising modulating the magnetic field within the inlet channel to facilitate movement of the particle enriched segment within inlet channel into the processing channel.

An eleventh embodiment (11) is a method of embodiments one through ten (1-10) further comprising detecting a particle property within the processing channel and modulating the sample flowrate to manipulate concentration of particles within the particle enriched flow stream. Embodiment twelve (12) is embodiment eleven (11) further comprising detecting a particle property within the particle enriched flow stream and modulating the sample flowrate to manipulate concentration of particles within the particle enriched flow stream. Embodiment thirteen (13) is a method of embodiments ten or twelve (10 or 12) further comprising detecting a particle property within the processing channel and modulating the magnetic field within the inlet channel to manipulate concentration of particles within the particle enriched flow stream.

A fourteenth embodiment (14) is the method of embodiment thirteen (13) further comprising detecting a particle property within the particle enriched flow stream and modulating the magnetic field within the inlet channel to manipulate concentration of particles within the particle enriched flow stream.

A fifteenth embodiment (15) is a method of embodiments one through ten (1-10) further comprising detecting a particle property within the inlet channel and modulating the sample flowrate to manipulate concentration of particles within the particle enriched flow stream. A sixteenth embodiment (16) is the method of embodiment ten (10) further comprising detecting a particle property within the inlet channel and modulating the magnetic field within the inlet channel to manipulate concentration of particles within the particle enriched flow stream. A seventeenth embodiment (17) is a method according to embodiments eleven through sixteen (11-16) further comprising detecting relative particle concentration or particle density. Embodiment eighteen (18) is a method according to embodiments ten through seventeen (10-17) further comprising detecting a chemical property within the processing channel and modulating the sample flowrate to manipulate concentration of particles within the particle enriched flow stream. A nineteenth embodiment (19) is a method according to embodiments ten through seventeen (10-17) further comprising detecting a chemical property within the particle enriched flow stream and modulating the sample flowrate to manipulate concentration of particles within the particle enriched flow stream.

A twentieth embodiment (20) is a method according to embodiments ten through seventeen (10-17) further comprising detecting a chemical property within the processing channel and modulating the magnetic field within the inlet channel to manipulate concentration of particles within the particle enriched flow stream. A twenty first embodiment (21) is the method of embodiment twenty (20) further comprising detecting a chemical property within the particle enriched flow stream and modulating the magnetic field within the inlet channel to manipulate concentration of particles within the particle enriched flow stream. A twenty-second embodiment (22) is a method of embodiments one through twenty-one (1-21) further comprising detecting a chemical property within the inlet channel and modulating the sample flowrate to manipulate concentration of particles within the particle enriched flow stream.

Embodiment twenty-three (23) is a method according embodiments ten through twenty-two (10-22) further comprising detecting a chemical property within the inlet channel and modulating the magnetic field within the inlet channel to manipulate concentration of particles within the particle enriched flow stream.

Embodiment twenty-four (24) is a method of embodiments eighteen to twenty-three (18-23) wherein the property is an electrochemical, photonic, spectroscopic, or binding property. Embodiment twenty-five (25) is a method according to embodiments one through twenty-four (1-24) further comprising diverting the particle depleted flow stream into a collection channel and capturing a fraction of the particle depleted flow stream.

Embodiment twenty-six (26) is a method according to embodiments one through twenty-five (1-25) further comprising diverting the particle enriched flow stream into a collection channel and capturing a fraction of the particle enriched flow stream.

Embodiment twenty-seven (27) is a method according to embodiments one through twenty-six (1-26) further comprising diverting the particle depleted flow stream and diverting the particle enriched flow stream into a respective collection channels and capturing a fraction of each flow stream. Embodiment twenty-eight (28) is a method according to embodiment twenty-seven (27) further comprising capturing multiple discrete fractions of the flow stream. Embodiment twenty-nine (29) is a method according to embodiments twenty-seven or twenty-eight (27 or 28) further comprising capturing nonsimultaneous fractions from the particle depleted flow stream and the particle enriched flow stream.

Embodiment thirty (30) is a method according to embodiments one through twenty-nine (1-29) further comprising adding a paramagnetic compound to the sample prior to introduction to the inlet channel. Embodiment thirty-one (31) is a method according to embodiments one through thirty (1-30) further comprising performing a subsequent reaction on an isolated fraction. Embodiment thirty-two (32) is the method of embodiment thirty-one (31) wherein the subsequent reaction is a binding, a PCR, a sequencing sample preparation, enzymatic degradation, or enzymatic synthesis reaction. Embodiment thirty-three (33) is the method of embodiment thirty-one (31) wherein the collected sample is subjected to cell culture, florescence-activated cell sorting, or magnetic levitation cell sorting.

Embodiment thirty-four (34) is a method according to any of embodiments one through thirty-three (1-33) wherein the sample fluid is first flowed at an angle that is substantially not linearly aligned to the processing channel and then flowed at an angle that is substantially linear with the processing channel.

Embodiment thirty-five (35) is a method of fractionating a blood sample comprising (i) providing a whole blood sample or diluted blood sample, and (ii) subjecting the sample to a sample concentration method of embodiments one through thirty-four (134) and isolating plasma and/or blood cells from a whole or diluted blood sample. A thirtysixth embodiment (36) is the method of embodiment thirty-five (35) wherein the blood sample is of a volume of from about 50 µL to about 10 mL. A thirty-seventh embodiment (37) is a method of embodiment thirty-six (36) wherein the plasma fraction contains less than about 1% of the blood cells in the blood sample. A thirty-eighth embodiment (38) is the method of embodiment thirty-seven (37) wherein the plasma fraction contains less than about 0.01% of the blood cells in the blood sample. A thirty-ninth embodiment (39) is the method of embodiment thirty-eight (38) wherein the plasma fraction is substantially free of the blood cells in the blood sample. A fortieth embodiment (40) is a method according to embodiments thirty-five through thirty-nine (35-39) wherein the blood sample is a peripheral blood sample, umbilical cord blood sample, fetal blood sample, or arterial blood sample. A forty-first embodiment (41) is a method according to embodiments thirty-five through forty (35-40) further comprising performing a diagnostic assay on an isolated fraction. A forty-second embodiment (42) is a method according to embodiment forty-one (41) wherein the assay is an enzyme immunoassay, chemiluminescent immunoassay, hemagglutination/particle agglutination assay, nucleic acid amplification technology assay, a drug assay, a forensic assay, or a genetic trait assay. Embodiment forty-three (43) is an embodiment according to any method of embodiments one through forty-one (1-41) where a reaction performed on the particles or components of the particle depleted layer within the inlet channel and/or the processing channel and, optionally concurrent with particle isolation/concentration. Embodiment forty-four (44) is an embodiment according to method embodiment forty-three (43) wherein the reaction is a binding or staining reaction.

Concentrator Device Embodiments

Embodiments of the device of the present invention are further described in the numbered embodiments below. The numbered embodiments are non-limiting of the invention and may incorporate further elements and alternatives described herein.

A first embodiment (1) is a magnetic fluidic sample processing device comprising, (i) a processing channel, (ii) an inlet channel, (iii) an inlet connection region connecting the inlet channel to the processing channel, (iv) a plurality of outlet channels, (v) an outlet connection region connecting the processing channel to the outlet channels, (vi) a first outlet channel in fluidic communication with an upper region of the processing channel at an outlet connection region, (vii) a second outlet channel in fluidic communication with a lower region of the processing channel at an outlet connection region, and (viii) a magnet aligned along the X-axis of the processing channel on either the upper side or the lower side of the processing channel.

A second embodiment (2) is a magnetic fluidic sample processing device comprising, (i) a processing channel, (ii) an inlet channel, (iii) an inlet connection region connecting the inlet channel to the processing channel, (iv) a plurality of outlet channels, (v) an outlet connection region connecting the processing channel to the outlet channels, (vi) a first outlet channel in fluidic communication with an upper region of the processing channel at an outlet connection region, (vii) a second outlet channel in fluidic communication with a lower region of the processing channel at an outlet connection region, and (viii) a plurality of magnetic components aligned along the X-axis of the processing channel on the upper side and lower side of the processing channel, wherein the processing device is constructed and arranged to provide preconcentration of particles prior to introduction into the processing channel.

A third embodiment (3) is a fluidic sample processing device comprising (i) a processing channel, (ii) an inlet channel, (iii) an inlet connection region connecting the inlet channel to the processing channel, (iv) a plurality of outlet channels, (v) an outlet connection region connecting the processing channel to the outlet channels, (vi) a first outlet channel in fluidic communication with an upper region of the processing channel at an outlet connection region, (vii) a second outlet channel in fluidic communication with a lower region of the processing channel at an outlet connection region, and (viii) an inlet channel flow controller.

A fourth embodiment (4) is the device of embodiment two wherein the magnetic components on the upper side of the processing channel and the lower side of the processing channel are constructed and arranged to provide a magnetic field of dissimilar strength the processing channel.

A fifth embodiment (5) is a device according to embodiments one through four (1-4) wherein the inlet channel comprises a first cross-sectional area and the processing channel comprises a second cross-sectional area, the first cross-sectional area being less than the second cross-sectional area. A sixth embodiment (6) is a device according to embodiment five (5) wherein the channels are microfluidic or capillary.

A seventh embodiment (7) is a device according to embodiments one through six (1-6) wherein the inlet connection region is tapered at an angle of less than 90 degrees. In an eighth embodiment (8) a device is provided of embodiment seven (7) wherein the angle is equal to or less than 60 degrees. In embodiment nine (9), a device according to embodiment eight (8) has a connection angle equal to or less than 45 degrees.

A tenth embodiment (10) provides for a device from embodiments one through nine (1-9) wherein the outlet connection region further comprises a flow stream splitter portion. Embodiment eleven (11) is a device of embodiment ten (10) wherein the flow stream splitter portion protrudes into the processing channel and is constructed and arranged to separate the respective flow streams into their outlet channels.

Embodiment twelve (12) is a device according to embodiments one through eleven (1-11) wherein the first outlet channel comprises a first outlet collection channel and first outlet diversion channel. Embodiment thirteen (13) provides for a device of embodiment twelve (12) wherein the first outlet channel further comprises a valve constructed and arranged such that the flow stream in the first outlet channel is in selectable fluidic communication with the first outlet collection channel or the first outlet diversion channel.

Embodiment fourteen (14) is a device of embodiments one through thirteen (1-13) wherein the second outlet channel comprises a second outlet collection channel and second outlet diversion channel.

Embodiment fifteen (15) is a device of embodiment fourteen (14) wherein the second outlet channel further comprises a valve constructed and arranged such frat the flow stream in the second outlet channel is in selectable fluidic communication with the second outlet collection channel or the second outlet diversion channel. Embodiment sixteen (16) provides for a device according to embodiments one through fifteen (1-15) wherein the fluidic device further comprises a magnet producing a gating magnetic field in the inlet channel or the inlet region. Embodiment seventeen (17) is a device of embodiment sixteen (16) wherein the magnet producing a gating magnetic field is an annular or toroidal magnet surrounding the inlet channel or inlet region. In embodiment eighteen (18), a device is provided according to embodiment sixteen (16) wherein the magnet producing a gating magnetic field is aligned and adjacent to the processing channel and extends to or beyond the channel inlet region of the inlet channel.

A nineteenth embodiment (19), a device of embodiments one through eighteen (1-18) comprises a processing channel that is optically transparent. In embodiment twenty, a device of embodiment one through eighteen (1-18) comprises an inlet channel that is optically transparent. Embodiment twenty-one provides for a device of embodiment one through twenty (1-20) further comprising an inlet channel flow controller a first outlet channel controller, a second outlet channel controller, or a combination thereof. Embodiment twenty-two (22) is a device according to embodiments 15-18 further comprising a magnetic field controller (operatively linked to the annular or toroidal magnet).

Embodiment twenty-three (23) provides for a device of embodiments one through twenty-two (1-22) wherein the fluidic device comprises one or more sensors. Embodiment twenty-four (24) is a device of embodiment twenty-three (23) wherein the sensor is selected from an optical sensor, capacitive sensor, conductive sensor, thermal sensor, flowrate sensor, ultrasonic sensor, gravimetric sensor, magnetic field sensor, or combinations thereof. Embodiment twenty-five (25) is a device according to embodiment twenty-four (24) wherein the sensor is a photodetector, a multipixel imaging detector, a magnetic field detector, an electrochemical detector, an optical phase detector, a scatter detector, a Hall sensor, a magnetoresistive sensor, a bolometric sensor, surface acoustic wave sensor, a biosensor, or combinations thereof.

A twenty-sixth (26) embodiment provides a device of embodiments twenty-three to twenty-five (23-25) wherein a sensor is integrated into or adjacent to the processing channel. A twenty-seventh embodiment (27) provides a device of embodiments twenty-three to twenty-five (23-25) wherein a sensor is integrated into or adjacent to the inlet channel. A twenty-eighth embodiment (28) provides a device of embodiments twenty-three to twenty-five (23-25) wherein a sensor is integrated into or adjacent to one or more outlet channels. Embodiment twenty-nine (29) is a device of embodiments twenty-three to twenty-five (23-25) wherein the fluidic device comprises one or more sensors in or adjacent to the processing channel, one or more sensors in or adjacent to the inlet channel, one or more sensors in or adjacent to at least one outlet channel, or combinations thereof.

Embodiment thirty (30) is a device according to embodiments twenty-five to twenty-seven (25-27) further comprising an inlet channel flow controller wherein at least one sensor is operatively linked to an inlet flow controller. Embodiment thirty-one (31) is a device according to embodiments twenty-five to twenty-eight (25-28) further comprising an outlet channel flow controller wherein at least one sensor is operatively linked to an outlet flow controller. Embodiment thirty-two is a device according to embodiments twenty-three to twenty-nine (23-29) further comprising an annular or toroidal magnet surrounding the inlet channel or inlet region and a magnetic field controller wherein a sensor is operatively linked to the magnetic field controller to control the magnet field of the annular or toroidal magnet.

Embodiment thirty-two (32) is a device according to device embodiments one through thirty-one (1-31) wherein the inlet channel is further comprised of portion substantially linear to the processing channel and a portion that is substantially not linearly aligned to the processing channel connecting at a portion that is angled with an angle, theta (θ) wherein θ≠180° and θ≥90°, is ≥100°, is ≥135°, is ≥140°, is ≥165°, >180°, is ≥205°, is ≥225°, is ≤250°, or is ≤270° relative to the Y or Z-axis or relative independently to the Y- and Z-axis.

Flowcell Cartridge Embodiments

An first embodiment (1) of a flowcell cartridge of the present invention comprising a planar substrate comprising an upper surface and a lower surface, a first longitudinal side forming an imaging surface, a second longitudinal side forming an illumination surface, and a first and second transverse side, an inlet well on an upper surface, an inlet channel, a sample processing channel in fluidic communication with the inlet channel and positioned substantially parallel to a longitudinal side, a sample splitter within the processing channel, a plurality of outlet channels in fluidic communication with the processing channel, and a plurality of collection wells in fluidic communication with each of the plurality of outlet channels wherein the substrate optionally comprises an optically transparent material and wherein the processing channel is offset within the plane of the of the substrate to be spatially biased to the imaging surface.

A second embodiment (2) of a flowcell cartridge of the present invention comprises a planar substrate comprising an inlet well on an upper surface, an inlet channel, a sample processing channel, a sample splitter withing the processing channel, a plurality of outlet channels in fluidic communication with the processing channel, and a plurality of collection wells in fluidic communication with each of the plurality of outlet channels wherein the substrate comprises an optically transparent material and wherein the combined volume each of the plurality of outlet channels is greater than the volume of the processing channel.

A third embodiment (3) is a flowcell cartridge according to embodiments 1 and 2 wherein the outlet channels follow compacted paths, one exemplary configuration being a serpentine channel.

A fourth embodiment (4) is a flowcell cartridge according to embodiments 1-3 wherein the outlet channels of the flowcell cartridge are formed as recesses within the planar substrate and a first outlet channel comprises a recess on a surface of the planar substrate and a second outlet channel comprises a recess on an opposite side of the planar substrate. In embodiments 1-4, the channels are formed by etching, machining, 3D printing, or molding the planar substrate.

A fifth embodiment (5) of the flowcell cartridge of embodiment 4 comprising one or more additional planar layers positioned over the recesses in the planar substrate to form enclosed channels.

A sixth embodiment (6) comprises the flowcell cartridge of embodiments 1-5, wherein the substrate is comprised of nonferrous metal, ceramic, glass, polymer, or plastic and, in the case of an embodiment with a substrate and one or more layers, the substrate and planar layer may be comprised of the same or different material.

A seventh embodiment (7) of the flowcell cartridge comprises embodiments 5-6 wherein the one or more planar layers are attached to the planar substrate by compression, adhesive bonding, preferably a biocompatible adhesive, more preferably a silicone or silicone-based adhesive, solvent bonding, ultrasonic welding, thermal bonding, welding, or 3D printing.

An eighth embodiment (8) of the flowcell cartridge comprises embodiments 5-7 wherein the planar substrate and the one or more planar layers are comprised of the same material.

A nineth embodiment (9) of the flowcell cartridge comprises the flowcell cartridge of embodiments 1-8 wherein the planar substrate comprises a polymer material.

A tenth embodiment (10) of the flowcell cartridge comprises the flowcell cartridge of embodiment 9 wherein the polymer material of embodiment 8 comprises cyclic olefin polymer or cyclic olefin copolymer.

An eleventh flowcell cartridge embodiment (11) comprises embodiments 1-10 and further comprises a collection well formed on the planar substrate and in fluidic communication with a terminal portion of an outlet channel.

A twelfth embodiment (12) of the flowcell cartridge of embodiments 1-11 wherein the collection well further comprises an internal channel inlet at a first well height and an internal outlet at a second well height wherein the inlet is in fluidic communication with an outlet channel of the flowcell cartridge and wherein the second well height is higher than the first well height.

A thirteenth embodiment (13) of the flowcell cartridge comprises the flowcell cartridges of embodiments 11-12 wherein the collection well further comprises a step providing an angled transition from a terminal aperture of the inlet to the collection well to the floor of the collection well.

A fourteenth embodiment (14) of the flowcell cartridges comprises the flowcell cartridge embodiments 11-13 further comprising a sealing film covering the top of one or more collection wells.

A fifteenth embodiment (15) of the flowcell cartridge comprises the flowcell cartridge embodiments 11-14 wherein the flowcell cartridge further comprises a collection well outlet channel in the planar substrate in fluidic communication with a collection well.

Cell Separation System Embodiments

A first cell separation system embodiment (1) of the present invention comprises a receiving block for retaining a flowcell cartridge, an optical system comprising an optical sensor, a lens, and an illumination source, and plurality of flow modulation components, wherein the receiving block removably places the flowcell cartridge in optical alignment with the optical system, removably engages a magnetic component adjacent to the processing channel of the flow cell, and removably places a plurality of outlet channels of the flowcell cartridge in fluidic communication with the plurality of flow modulation components.

In a second embodiment (2), embodiment 1 further comprises a source of visible optical illumination constructed and arranged to provide light transmission through the processing channel within the planar substrate.

In a third embodiment (3), the system of embodiments 1-2 further comprise one or more sources of ultraviolet illumination constructed and arranged to place the ultraviolet illumination, optionally at wavelengths of about 474 nm and/or 560 nm, in an angular orientation to a processing channel within a planar substrate retained in the receiving block.

In a fourth embodiment (4) of the cell separation system comprising embodiment 3, the optical system comprises a dual bandpass filter preferably passing emitted radiation in bands centered at wavelengths at about 524 nm and 628 nm.

Live Cell-Dead Cell Separation Method Embodiments

A first embodiment (1) of a method for separation of a mixture of live cells and dead cells comprises providing flowcell cartridge comprising a processing channel, and a plurality of outlet channels wherein the outlet channels of the flowcell cartridge have a volume greater than the processing channel, flowing a sample solution comprising live cells and dead cells and a paramagnetic compound into the processing channel, placing the flowcell cartridge in a magnetic field substantially aligned parallel to the processing channel, maintaining the processing channel and the sample contained therein entirely within the magnetic field in a stopped flow condition for a period of time sufficient to separate live cells and dead cells by a vertical distance within the processing channel, simultaneously withdraw a sample fraction enriched with live cells and a sample fraction enriched with dead cells into the outlet channels.

A second embodiment (2) comprising the method of embodiment 1 further comprises providing a flowcell cartridge that is substantially free of any liquid or paramagnetic compound prior to introduction of the sample solution.

A third embodiment (3) of the separation method comprises the methods of embodiments 1-2 further comprising providing a flowcell cartridge wherein the outlet channels have a cross sectional area less than the cross sectional area of the processing channel and are arranged to follow compacted paths, one exemplary configuration being a serpentine channel.

A fourth embodiment (4) comprises the methods of embodiments 1-3 further comprising providing a magnetic field in close proximity to the top vertical surface of the processing channel and in close proximity to the bottom vertical surface of the processing channel, each magnetic field have similar strength and surface field strength of between about 0.8 Tesla and about 2.0 Tesla and optionally between about 0.9 Tesla and about 1.4 Tesla.

A fifth embodiment (5) of the separation method comprises the methods of embodiments 1-4 further comprising providing a paramagnetic compound in the sample solution at a concentration of from about 50 mM to about 200 mM, optionally from about 65 mM to about 175 mM, and further optionally from about 70 mM to about 150 mM.

A sixth embodiment (6) of the separation method comprises separation method embodiments 1-5 further comprising the step of withdrawing the sample fractions into the outlet channels at a flow rate of from about 75 µL per minute to about 150 µL per minute, and optionally at about 75 µL per minute, about 90 µL per minute, about 100 µL per minute, about 110 µL per minute, about 120 µL per minute, or about 150 µL per minute.

A seventh embodiment (7) of the separation method comprises embodiments 1-6, wherein the enriched recovered sample fraction comprises at least about 60%, at least about 70%, at least about 80% or at least about 90% live cells.

An eighth embodiment of the separation method comprises embodiments 1-7 wherein the yield of live cells in the enriched recovered sample fraction is at least about 50%, at least about 60%, at least about 70%, or at least about 75% of the total live cell composition of the sample.

BRIEF DESCRIPTION OF THE DRAWINGS

FIGS. 1A-1D are cross-sectional views of embodiments of a single-magnetic component particle concentrating and isolating device as described herein.

FIGS. 2A-2F are cross-sectional views of embodiments of a single-magnetic component particle concentrating and isolating device as described herein with angled inlet channel.

FIGS. 3A-3D are cross-sectional views of embodiments of a single-magnetic component particle concentrating and isolating device as described herein with angled inlet channel and inlet magnet field component.

FIGS. 4A-4D are cross-sectional views of embodiments of a particle concentrating and isolating device as described herein a magnetic component surrounding a portion of an inlet channel.

FIGS. 8A-8H are cross-sectional views of embodiments of a particle concentrating and isolating device as described herein with angled inlet channel and inlet magnet field component.

FIGS. 9A-9B are cross-sectional views of an embodiment of a particle concentrating and isolating device as described with selectable valves and inlet channel pump component.

FIG. 11 depicts operation of single magnetic component embodiment of a particle concentrating and isolating device as described herein.

FIG. 12 depicts operation of an angled inlet channel embodiment of a particle concentrating and isolating device as described herein.

FIG. 13 depicts flow-enabled fractionation of a particle-containing sample according to operational embodiments of a particle concentrating and isolating device as described herein.

FIG. 14 depicts inlet channel magnetic field assisted concentration of a sample according to embodiments of a particle concentrating and isolating device as described herein.

FIG. 15 depicts inlet channel magnetic field assisted concentration of a sample according to embodiments of a particle concentrating and isolating device as described herein.

DETAILED DESCRIPTION OF THE INVENTION

I. Definitions/Nomenclature

Figure 5A:
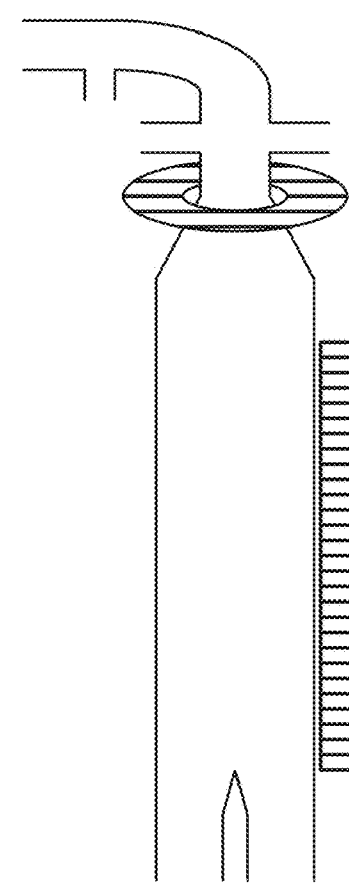
FIGS. 5A-5D are cross-sectional views of embodiments of a single-magnetic component particle concentrating and isolating device as described herein with angled inlet channel and inlet magnet field component.
Figure 5C:
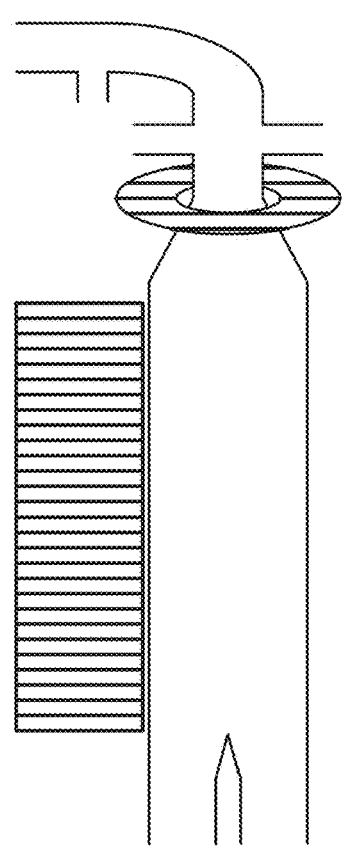
Figure 5B:
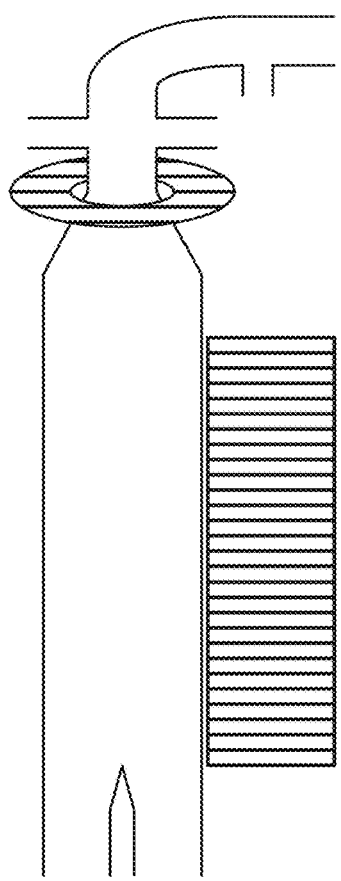
Figure 5D:
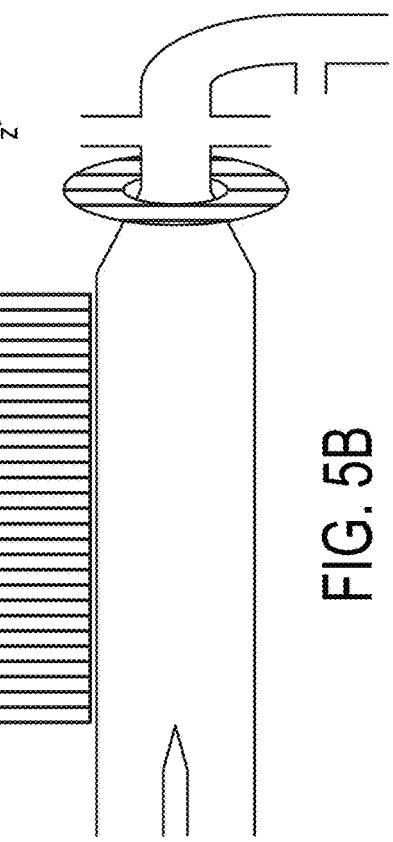

The following definitions are provided to aid in understanding the invention. Unless otherwise defined, all terms of art, notations and other scientific or engineering terms or terminology used herein are intended to have the meanings commonly understood by those of skill. In some cases, terms with commonly understood meanings are defined herein for clarity and/or for ready reference, and the inclusion of such definitions herein should not be assumed to represent a substantial difference over what is generally understood in the art but is intended to compliment such general understandings. To the extent a definition herein is inconsistent with what is generally understood in the art, unless expressly stated otherwise, both the definition provided herein and what is generally understood in the art shall be deemed to be within the scope of the present invention as alternative embodiments.

As used herein unless otherwise indicated, open terms such as "contain," "containing," "include," "including," and the like mean comprising.

Some embodiments herein contemplate numerical ranges. When a numerical range is provided, the range includes the range endpoints unless otherwise indicated. Unless otherwise indicated, numerical ranges include all values and subranges therein as if explicitly written out.

As used herein, the article "a" means one or more unless explicitly stated otherwise.

Some values herein are modified by the term "about." In some instances, the term "about" in relation to a reference numerical value can include a range of values plus or minus 10% from that value. For example, the amount "about 10" can include amounts from 9 to 11. In other embodiments, the term "about" in relation to a reference numerical value can include a range of values plus or minus 10%, 9%, 8%, 7%, 6%, 5%, 4%, 3%, 2%, or 1% from that value. Where a series of values is prefaced with the term "about," the term is intended to modify each value included in the series.

As used herein, the term "asymmetric" about a magnetic field means that the magnetic field in the region of an associated fluidic channel is not symmetric about one or more planes passing through the center of the fluidic channel, and in accordance with a preferred embodiment it is not symmetric about the horizontal plane.

As used herein, the terms "capillary" or "capillary tube," refer to a tube having a channel as defined hereinbelow.

As used herein, the terms "channel", "flow channel," "fluid channel" and "fluidic channel" are used interchangeably and refer to a pathway on a fluidic device in which a fluid can flow. Channel includes pathways with a maximum height dimension of about 100 mm, about 50 mm, about 30 mm, about 25 mm, about 20 mm, about 15 mm, about 10 mm, about 5 mm, about 5 mm, about 3 mm, about 2 mm, about 1 mm, or about 0.5 mm. The channel between magnets has dimensions of about 30 mm×0.5 mm, about 25 mm×1 mm, about 20 mm×2 mm, about 15 mm×3 mm, about 10 mm×5 mm, about 5 mm×3 mm, about 3 mm×2 mm, about 2 mm×1 mm, or about 1 mm×0.5 mm. For example, the channel between magnets has dimension of about 2 mm×1 mm. The internal height of the channel may not be uniform across its cross-section, and geometrically the cross-section may be any shape, including round, square, oval, rectangular, or hexagonal. The term "channel" includes, but is not limited to, microchannels and nanochannels, and with respect to any reference to a channel herein, such channel may comprise a microchannel or a nanochannel.

As used herein, the term "concentration" means the amount of a first component contained within a second component, and may be based on the number of particles per unit volume, a molar amount per unit volume, weight per unit volume, or based on the volume of the first component per volume of the combined components.

As used herein, the term "fluidically coupled" or "fluidic communication" means that a fluid can flow between two components that are so coupled or in communication.

As used herein, the terms "isolate" or "isolating" or "separate" or "separating" or "segregate" or "segregating" are used interchangeably, and they are in reference to a component means separating such component from other components, and includes increasing the concentration of a component within a solution, or separating a component from other components in a solution, or a combination of both increasing the concentration of a component within a solution while separating such component from other components in the solution. A particle within a solution is deemed "isolated" if it is segregated from other particles within the solution and/or positioned within a defined portion of the solution. A particle or component within a solution is also deemed "isolated" if after processing the solution the concentration of such particle or component is increased by a ratio of at least about 100:1, 90:1, 80:1, 70:1, 60:1, 50:1, 40:1, 30:1, 20:1, 10:1, 5:1, 3:1 or 2:1. Particles of interest within a solution containing other particles are deemed "isolated" if after processing such solution the ratio of the concentration of such particles of interest to the concentration of such other particles is increased, or if the ratio of the concentration of such particles of interest to the concentration of such other particles is increased by at least about 100%, 200%, 300%, 400%, 500%, 600%, 700%, 800%, 900%, or 1000%, or if the concentration of such other components is decreased to less than about 20%, 15%, 10%, 8%, 6%, 5%, 4%, 3%, 2%, 1%, or 0.5%.

As used herein, the term "fluidic" refers to a system, device or element for handling, processing, ejecting and/or analyzing a fluid sample including at least one "channel" as defined hereinabove. The term "fluidic" includes, but is not limited to, microfluidic and nanofluidic.

As used herein, the term "fluidic function" refers to any operation, function or process performed or expressed on a fluid or sample in a fluidic system, including, but not limited to filtration, pumping, fluid flow regulation, controlling fluid flow and the like.

As used herein, the term "particle" refers to any matter, including, but not limited to atoms, chemical elements, molecules, compounds, biomolecules, cells, necrotic cells, apoptotic cells, cancer cells, cancer or tumor circulating cells, blood, plasma, proteins, lipids, bodily fluid, nucleic acids, nucleotides, amino acids, peptides, antibodies, antigens, carbohydrates, microorganisms, bacteria, viruses, fungi, sperms, gametes, eggs, embryos, or any physical substance with its largest dimension in any direction being less than about 3 mm, 2 mm, 1 nun, 0.5 mm, 0.25 mm, 100 microns, 75 microns, 50 microns, 40 microns, 30 microns, 20 microns, 10 microns, 5 microns, 2 microns, 1 micron, or 0.1 micron. The particle may have the largest dimension in any direction being about 0.001 micron to about 3 mm, about 0.1 micron to about 2 mm, about 0.5 microns to about 1.5 mm, about 10 microns to about 1 mm, or about 20 microns to about 100 microns.

As used herein, the term "port" refers to a structure for providing fluid communication between two elements using, for example, a fluidic channel. The terms "inlet port" or "inlet opening" or "input opening" or "input channel" are used interchangeably, and they refer to the opening where sample fluid is injected into the device described herein.

As used herein, the term "concentrate" or "concentrating" refers to making a substance in a medium with increased population density or purer by removing water, aqueous or non-aqueous medium or other substances. The substance is a type of particle or a mixture of particles as described herein. Typically, concentrating as described herein involves facilitated sedimentation of the particles or a mixture of particles in a medium, thereby bringing the particles or a mixture of to a particular area. Alternatively, concentrating may involve separating a particular type of particle from a mixture of particles and collecting the particular type of particle in a collecting channel, typically with pre-determined volume of a liquid medium. The concentrating need not involve spinning or rotating the bulk sample in order to concentrate the particles. Concentration performed by the present invention allows of separation of particles without significant damage, lysis, or shearing of the particles. Additionally, under certain conditions of operation, the present invention provides for flocculation or crystallization within a sample during operation and isolation of the flocculated or crystallized particles of the sample.

Where methods and steps described herein indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

II. Magnetic Field

The present disclosure provides for methods and devices for concentrating using a magnetic field within a processing channel or inlet channel. The interaction of the magnetic field with the paramagnetic properties of particles within a sample fluid can either provide a repulsive or attractive effect on the particles to facilitate separation or concentration.

In accordance with an embodiment, magnets are permanent magnets or electromagnets. In accordance with an embodiment, the maximum energy product of magnets range from about 1 Mega-Gauss Oersted to about 1000 Mega-Gauss Oersted, and more preferably ranges from about 10 Mega-Gauss Oersted to about 100 Mega-Gauss Oersted. In accordance with an embodiment, the surface field strength of magnets range from about 0.1 Tesla to about 100 Tesla, and more preferably ranges from about 1 Tesla to about 10 Tesla. In accordance with an embodiment, the remanence of magnets range from about 0.5 Tesla to about 5 Tesla, and more preferably ranges from about 1 Tesla to about 3 Tesla.

In accordance with a preferred embodiment, magnets are made from a material comprising neodymium alloys with iron and boron, neodymium, alloys of aluminum with nickel, neodymium alloys with iron, aluminum and cobalt alloyed with iron, samarium-cobalt, other alloys of rare earth elements with iron, alloys of rare earth alloys with nickel, ferrite, or combinations thereof. In accordance with an embodiment comprising a plurality of magnets, magnets are made from the same material or are made from different materials.

In accordance with an embodiment, an asymmetric magnetic field is achieved by using a stronger magnetic material on one side of a fluidic channel and a weaker magnetic material on the opposite side of the fluidic channel. In accordance with a preferred embodiment, an asymmetric magnetic field is achieved by using a magnetic material on one side of a fluidic channel and a substantially similar magnetic material on the opposite side of the fluidic channel. In accordance with such embodiment, upper magnet and lower magnet may be substantially the same size. In accordance with such embodiment, upper magnet may comprise neodymium, lower magnet may comprise samarium-cobalt, and wherein both magnets are substantially the same size. Alternatively, upper magnet may comprise samarium-cobalt, lower magnet may comprise neodymium, and wherein both magnets are substantially the same size.

In accordance with an embodiment, alternative magnet configurations may be used. Referring to, the device in accordance with the present invention may include multiple upper magnets and multiple lower magnet positioned around a fluidic channel. Upper magnets may include an anterior upper magnet, a central upper magnet, and a posterior upper magnet. Lower magnets may include an anterior lower magnet, a central lower magnet, and a posterior lower magnet.

Figure 6:
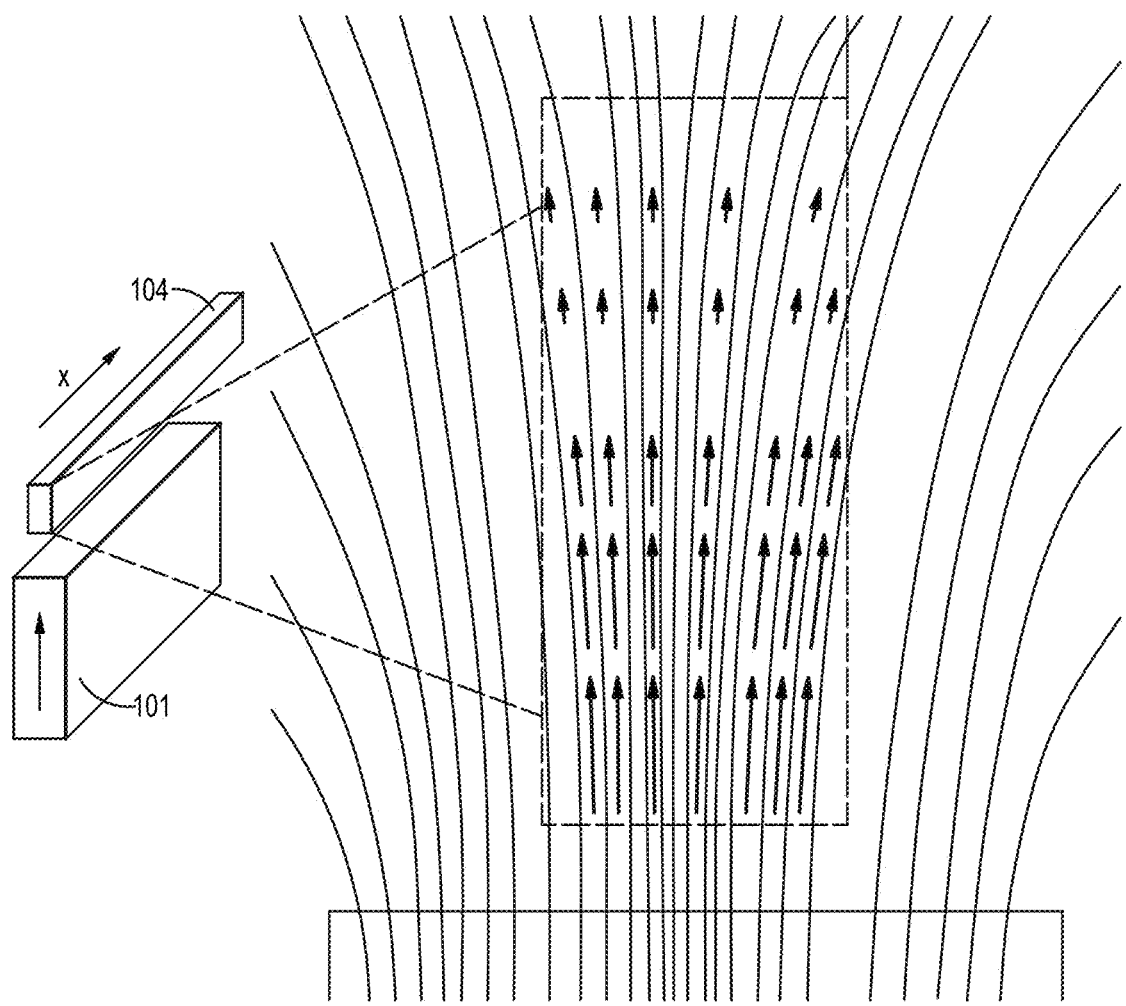
FIG. 6 depicts the magnetic field imposed within a processing channel in a single magnetic component configuration in accordance with an embodiment as described herein.
Figure 7C:
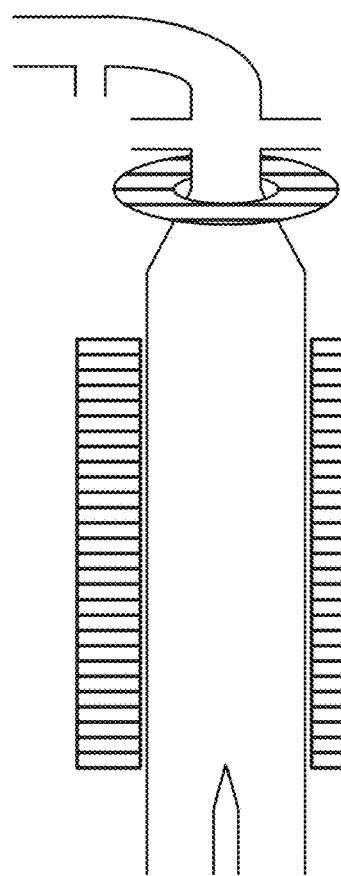
FIGS. 7A-7D are cross-sectional views of embodiments of a multiple-magnetic component particle concentrating and isolating device as described herein with angled inlet channel and inlet magnet field component.
Figure 7D:
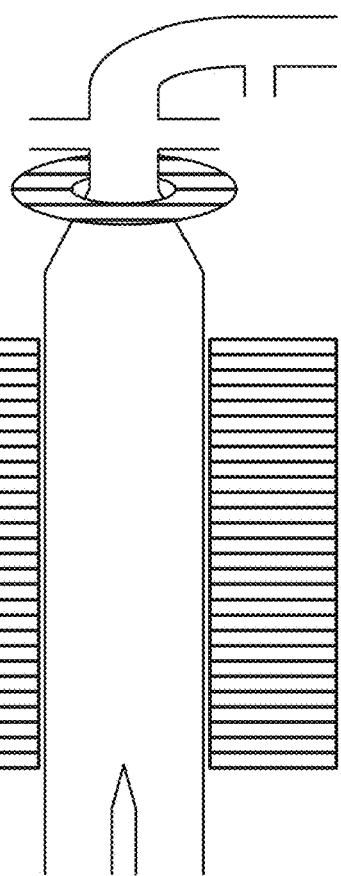
Figure 7A:
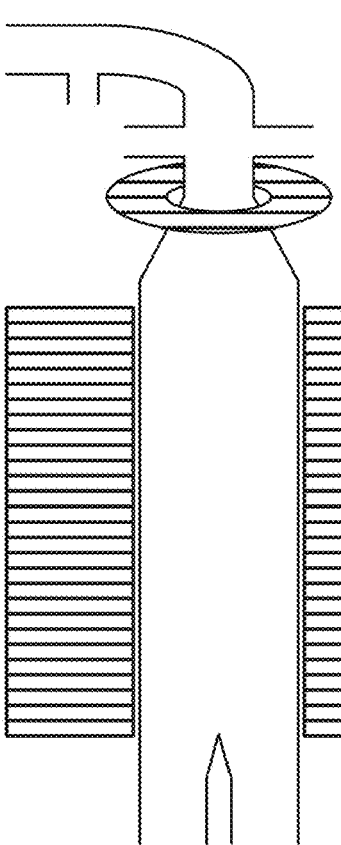
Figure 7B:
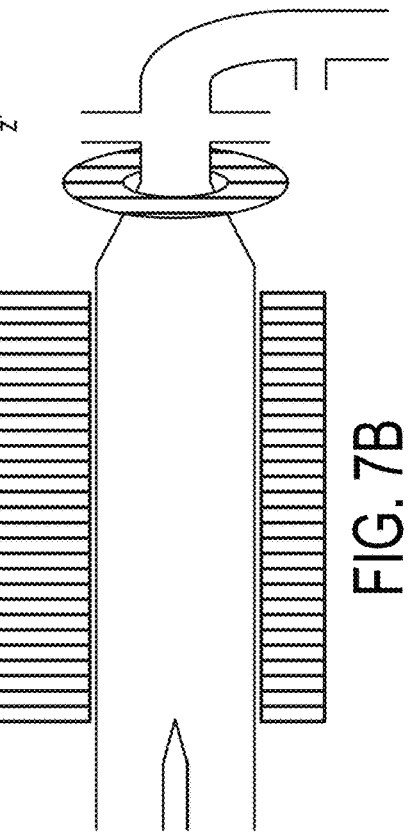

In accordance with another magnet configuration, the device may include an anterior upper magnet, a posterior upper magnet, an anterior lower magnet, and a posterior lower magnet, wherein the magnets are positioned around fluidic channel. The anterior upper magnet and the posterior lower magnet are positioned in a magnetic repelling orientation. Exemplary NdFeB magnetic component dimensions include, for a bottom magnet component about 50×15×2 mm (magnetized through the 15 mm axis), 50×5×2 mm (magnetized through the 5 mm axis) for a top magnet component. Other magnet component embodiments include 60×15×2 mm, 60×5×2 mm, 75×20×3 mm, and 25×15×2 mm. FIG. 6 illustrates an embodiment with a rectangular magnet substantially aligned along the X-axis at the bottom of processing channel 104 showing magnetic field lines and magnetic force within the processing channel. An additional preferred magnet component embodiment includes an upper and lower magnet with dimensions of about 75×20×3.2 mm, and a spacing between upper and lower magnets of about 2.5 mm, about 3.0 mm, about 3.5 mm, about 2.9 mm, about, 3.0 mm, about 3.1 mm, about 3.2 mm, about 3.3 mm, or about 2.72 mm, about 2.88 mm, about 2.98 mm, about 3.18 mm, about 3.20 mm, or about 3.37 mm.

In a preferred embodiment the device has and upper magnet and a lower magnet wherein the flower magnet extends into the inlet channel. The bottom magnet dimensions can be about 50 mm to about 100 mm×about 10 mm to about 30 mm×about 2 mm to about 4 mm. An preferred embodiments include about 75 mm, about 80 mm, about 85 mm, about 90 mm, about 93 mm, or about 95 mm×about 15 mm, about 18 mm, about 20 mm, about 23 mm, and about 25 mm×about 2 mm, about 2.3 mm, about 2.5 mm, about 2.7 mm, about 3 mm, about 3.18 mm and about 3.5 mm. Magnet spacing between upper and lower magnets preferably is between 2 to 4.3 mm, about 2.5 mm, about 4.0 mm, about 3.5 mm, about 2.9 mm, about, 3.0 mm, about 3.1 mm, about 3.2 mm, about 3.3 mm, or about 2.72 mm, about 2.88 mm, about 2.98 mm, about 3.18 mm, about 3.20 mm, about 3.37 mm, about 3.5 mm, about 3.7 mm, or about 4 mm.

Embodiments of the fluidic concentrating device incorporating parallel magnet components on top and bottom and substantially aligned along the X-axis of the processing channel are illustrated in FIG. 7A-D.

III. Paramagnetic Medium

Samples processed by magnetic facilitated concentration by the present invention will typically have an added paramagnetic component or an added diamagnetic component. In accordance with the method of the present invention, a substance containing particles of interest is combined with a paramagnetic medium to create a processing solution. The paramagnetic medium comprises a paramagnetic material and a solvent. In accordance with a preferred embodiment, the paramagnetic medium is biocompatible, i.e. capable of being mixed with live cells and not impact the viability of the cells or impacting cellular behavior, e.g. impacting gene expression. The paramagnetic material may be selected from the group comprising gadolinium, titanium, vanadium, dysprosium, chromium, manganese, iron, nickel, gallium, including ions thereof and combinations thereof. In accordance with an embodiment the paramagnetic material is selected from the group comprising titanium (III) ion, gadolinium (III) ion, vanadium (I) ion, nickel (II) ion, chromium (III) ion, vanadium (III) ion, dysprosium (III) ion, cobalt (II) ion, and gallium (III) ion. In accordance with a preferred embodiment, the paramagnetic material comprises a chelated compound. In accordance with a preferred embodiment, the paramagnetic material comprises a gadolinium chelate, a dysprosium chelate, or a manganese chelate. In accordance with an embodiment, the paramagnetic medium comprises a paramagnetic material, salts, and other additives that function to maintain cellular integrity. In an embodiment of the invention the paramagnetic material may be [Aliq]$_2$ [MnCl$_4$], [Aliq]$_3$ [GdCl$_6$], [Aliq]$_3$ [HoCl$_6$], [Aliq]$_3$ [HoBr$_6$], [BMIM]$_3$ [HoCl$_6$], [BMIM] [FeCl$_4$], [BMIM]$_2$ [MnCl$_4$], [BMIM]$_3$ [DyCl$_6$], BDMIM]3 [DyCl$_6$], [AlaCl] [FeCl$_4$], [AlaCl]$_2$ [MnCl$_4$], [AlaCl]$_3$ [GdCl$_6$], [AlaCl]$_3$ [HoCl$_6$], [AlaCl]$_3$ [DyCl$_6$], [GlyC2] [FeCl$_4$] as described in U.S. patent application Ser. No. 14/407,736 which is incorporated herein by reference.

In accordance with an embodiment, the paramagnetic material may be present in the paramagnetic medium at a concentration of at least about 10 mM, 20 mM, 30 mM, 40 mM, 50 nM, 60 mM, 70 mM, 80 mM, 90 mM, 100 mM, 120 mM, 150 mM, 200 mM, 250 mM, 300 mM, 500 mM, or 1 M. In accordance with an embodiment, the paramagnetic material may be present in the paramagnetic medium at a concentration of about 10 mM to about 50 mM, about 25 mM to about 75 mM, about 50 mM to about 100 mM, about 100 mM to about 150 mM, about 150 mM to about 200 mM, about 200 mM to about 250 mM, about 250 mM to about 300 mM, about 300 mM to about 500 mM, or about 500 mM to about 1 M.

In accordance with an embodiment, the paramagnetic material comprises gadolinium and is present in the paramagnetic medium at a concentration of at least about 10 mM, 20 mM, 30 mM, 40 mM, 50 mM, 60 mM, 70 mM, 80 mM, 90 mM, or 100 mM. In accordance with an embodiment, the paramagnetic material comprises gadolinium and is present in the paramagnetic medium at a concentration of about 10 mM to about 50 mM, about 25 mM to about 75 mM, or about 50 mM to about 100 mM.

IV. Device Configuration

Referring to FIGS. 1 to 5, and 7-10, various embodiments of a particle concentration device of the present invention for particle concentrating and isolating are shown wherein the device's inlet channel, processing channel, and outlet channels portion comprise separate individual components that are interconnected. The processing channel is preferably an elongated fluidic channel that has sufficient length along the x-axis to allow sufficient time for processing a fluid containing the particles of interest based on the residence time required for the particles to concentrate within a layer of the flow stream (where "layer" in this sense indicates a small range of positions along the y-axis) within the processing channel, and based on the desired throughput from the system. In some embodiments, the processing channel is a fluidic channel that has a height of about 200 microns to about 30 mm, about 200 microns to about 20 mm, about 200 microns to about 15 mm, about 200 microns to about 10 mm, about 200 microns to about 5 mm, about 200 microns to about 2 mm, about 200 microns to about 1 mm, about 0.5 mm to about 1 mm, about 0.5 mm to about 2 mm, about 0.5 mm to about 3 mm, about 1 mm to about 2 mm, about 1 mm to about 3 mm, or about 1.5 mm to about 2 mm. In accordance with an embodiment, the processing channel has a length of about 20 mm to about 200 mm, about 20 mm to about 150 mm, about 20 mm to about 100 mm, about 20 mm to about 50 mm, about 40 mm to about 100 mm, about 40 mm to about 90 mm, or about 40 mm to about 80 mm. For some embodiments, the channel depth (in the Z direction) is about 100 microns to about 5 mm, about 500 microns to about 3 mm, about 1 mm to about 2.5 mm, or about 1.5 mm to about 2 mm. Channel length embodiments may be 40, 45, 50, 60, 70 mm in length. Dimensions of exemplary processing channels include 1 mm and 1.9 mm tall (Y-axis, vertical in images)×0.8 or 1.0 or 1.5 or 2.0 mm deep (Z-axis), with length (X-axis) 40-70 mm. A preferred embodiment of the processing channel has dimensions of exemplary processing channels include about 2 mm tall (Y-axis, vertical in images)×about 2.0 mm deep (Z-axis), with length (X-axis) about 50-70 mm. Further preferred processing channel embodiments have a length of about 55 mm, about 56, mm, about 57 mm, about 58 mm, about 59 mm, about 60 mm, about 61 mm, about 62 mm, about 63 mm, about 64 mm, about 65 mm, or about 66 mm.

The processing channel may have any cross-sectional geometric configuration and may comprise a cross sectional geometric configuration that is square, rectangular, round or oval. The geometric characteristics of processing channel described herein are equally applicable to the inlet, outlet, and any other fluidic channel described above in reference to the component configuration of the present invention.

The cross-sectional area of the inlet channel (which would be $\pi r^2$ where r is the radius of the inside diameter of the channel when the channel is circular) is substantially smaller than the cross-sectional area of the processing channel. In this context, "diameter" is used to describe a characteristic cross-sectional dimension, and the channel may not be circular in cross-section. In various embodiments, the cross-sectional area of the inlet channel is at least 100 times, 80 times, 50 times, 40 times, 20 times, 10 times, 8 times, 6 times, 4 times, or 2 times smaller than the cross-sectional area of the processing channel. In some embodiments, the cross-sectional area of the inlet channel is at least 10 times smaller than the cross-sectional area of the processing channel. In some embodiments, the cross-sectional area of the inlet channel is at least 5 times smaller than the cross-sectional area of the processing channel. In some embodiments, the cross-sectional area of the inlet channel is at most 0.2 mm$^2$, at most 0.8 mm$^2$, at most 3.1 mm$^2$, at most 7.1 mm$^2$, at most 12.6 mm$^2$, at most 19.6 mm$^2$, at most 28.3 mm$^2$, at most 38.5 mm$^2$, at most 50.3 mm$^2$, at most 78.5 mm$^2$, at most 176.7 mm$^2$, or at most 314.2 mm$^2$. Outlet channels typically have similar dimensional characteristics as the inlet channel but may have varying cross-sectional areas as described below.

Embodiments of the particle concentrating device include a tapered inlet portion to the processing channel (103) the particle isolation device of the present invention also includes a tapered entry port to reduce turbulent flow caused by vortices and thus reduce associated shear forces associated with the connection of fluidic channels of disparate cross-sectional areas. These vortexes may reduce the efficiency or rate of processing a sample, by providing locations where cells or other particles can be trapped in a circulating path, rather than flowing through the device. Vortex flow may also induce shear stresses on particles such as cells. The angle of taper may be between about 10° to about 70°, preferably between about 20° to about 60°, between about 30° to about 45°, or, in some embodiments, about 30°.

The outlet portion of the device may comprise a splitter that aids in diversion of portions of the sample stream in the processing channel into discrete streams for isolation or further processing. The splitter is preferably positioned within the processing channel, but near the trailing end of the processing channel, so that any particle isolation achieved by passing the fluid through the processing channel is maintained as the fluid exits the device. The splitter may comprise one or more horizontal partitions that extend from the outlet channels into the trailing end of the processing channel. The splitter may extend into the processing channel with a length between 0.5-3.5×, 1-3×, 1.5-2.5×, 1-2×, or 2× the distance between magnets on embodiments with magnets aligned substantially along the X-axis and on opposite sides of the processing channel. For singe magnet embodiments of the particle concentration device, the splitter may extend into the processing channel 1-5×, 1.5-5×, 1.5-4×, 2-4×, 3-4×, or 4× the thickness of the single magnet component in the Z-axis direction. For embodiments with no magnet component aligned along the X-axis of the processing channel, the splitter may extend between 5-40%, 5-30%, 5-25%, 10-30%, 10-20%, or 10-15% of the processing channel length, preferably greater than 5%, preferably less than 35%. The splitter tapers to point at the terminal end within the processing channel. The angle of taper maybe between about 5° to about 45°, preferably between about 10° to about 30°, between about 15° to about 25°, or, in some embodiments, about 20°. The processing channel may be horizontally divided using the splitter. In addition, the splitter may include one or more vertical partitions, thereby creating a horizontal and vertical grid of effluent fluidic outlet openings in fluidic communication leading to a plurality of outlet channels. In this embodiment, the plurality of outlet channels near the trailing end of the processing channel lead through outlet ports a plurality of collecting chambers, such as collecting tubes or Eppendorf tubes. The splitter(s) defines a plurality of outlet channels. In accordance with an embodiment, the particle concentration device of the present invention includes a splitter that defines 2, 3, 4, 5, 6, 7, 8, 9 or 10 outlet channels. In accordance with an embodiment, the particle concentration device of the present invention includes a splitter that defines at least 2, at least 3, at least 4, at least 5, at least 6, at least 7, at least 8, at least 9, or at least 10 outlet channels. In accordance with an embodiment, the particle concentration device of the present invention includes a splitter that defines 2 to 4, 5 to 7, or 8 to 10 outlet channels. The splitter described herein, and the various resulting outlet channels, may be incorporated into the processing channel described above in reference to the component configuration of the present invention.

The plurality of outlet channels extend from the processing channel to a corresponding plurality of outlet ports. The plurality of outlet channels may include fluidic flow modulators, such as pumps or output valves, that control the amount of flow from processing channel through the respective effluent channels to the respective outlet ports. The division of sample solution into each effluent fraction may be achieved by increasing or decreasing the fluid flow toward individual outlets, such that the ratio of division can be modified. In accordance with an embodiment the ratio may be modified by up to 50%. For example, if the splitter comprises two channels with equal cross-section, the geometric ratio of division is 1:1. By withdrawing a larger (or smaller) amount of fluid into one fraction through the application of a larger (or smaller) pumping rate than is applied to the other fraction, the ratio of division can be altered, e.g. to about 3:1, 4:1, 5:1, 6:1, 7:1, 8:1, 9:1 or 10:1. In a preferred embodiment, the division for such geometric ratio would be within the range of about 2:1 to about 1:2. In a further preferred embodiment, the division for such geometric ratio would be within the range of about 10:1 to about 1:10. The division could be about 1:10, about 1:9.5, about 1:9, about 1:8.5, about 1:8, about 1:7.5, about 1:7, about 1:6.5, about 1:6, about 1:5.5, about 1:5, about 1:4.5, about 1:4, about 1:3.5, about 1:3, about 1:2.5, about 1:2, about 1:1.5, about 1:1, about 1.5:1, about 2:1, about 2.5:1, about 3:1, about 3.5:1, about 4:1, about 4.5:1, about 5:1, about 5.5:1, about 6:1, about 6.5:1, about 7:1, about 7.5:1, about 8:1, about 8.5:1, about 9:1, about 9.5:1, about 10:1 each ratio respective of an upper outlet channel flowrate to a lower channel flowrate.

FIG. 1A illustrates a device with a single magnet component (101) substantially aligned along the top X-axis of processing channel (104), an inlet channel (102) and an inlet connection region (103), a plurality of outlet channels (106) and a flow stream splitter portion (105). FIG. 1B illustrates a similar configuration with 101 aligned along the bottom of the processing channel. FIG. 1C illustrates the configuration in 1A with an additional magnet component or portion (107) extending beyond the processing channel and into the inlet portion. FIG. 1D illustrates this type of configuration with a magnet component substantially aligned along the X-axis of the bottom of the processing channel and extending into the inlet portion. In accordance with an embodiment, one or both of the upper magnet and the lower magnet are movably mounted within the system to allow controlled adjustment of the vertical position of the magnet relative to fluidic channel and thereby adjust magnetic field strength within the channel. The use of inlet channel geometry and inlet channel magnetic field are used in certain embodiments of the invention to modulate particle concentration within the processing channel. By accumulating particles at or near the inlet of the processing channel, certain embodiments provide the ability to create portions of the flow stream that vary in their relative enrichment of particles. For example, accumulation of particles at or near the inlet of the processing channel may result in the instant depletion of quantity of particles in the flow stream within the processing channels. By releasing or surmounting the particle restraining force, sedimentary, magnetic or a combination thereof, the particle concentration within the flow stream in the processing channel is then increased. Temporally, this may result in varying levels of particle enrichment within the particle enriched layer of the flow stream in the processing channel. This selective process is useful, in one aspect, in creating flow stream fractions of particular interest to the user of the device and methods of the invention who can identify and utilize the particularly enhanced (enriched) or particularly depleted flow stream fractions.

FIGS. 2A-D illustrate a single magnet component configuration further comprising an inlet channel portion (203) with a portion substantially linearly aligned to the processing channel and a portion that is not linearly aligned to the processing channel connecting at a portion that is angled with an angle, theta (θ). The nonlinear inlet portion may contain one or more intersecting channels (201) and the linear inlet portion may comprise one or more intersecting channels (202) The intersecting channels to the inlet channel provide for the introduction or removal of liquids, suspensions, or gases. Intersecting channels can provide for reagent introduction into a sample flow stream such as paramagnetic medium, buffer, flocculating agent, sample preconditioning reagent or reactant, and the like. The intersecting channels may also be used to introduce reactant reagents into the sample medium for reaction with particles or other components of the sample medium within the inlet channel or within the processing channel. For example, a cell staining reaction or ligand binding reaction can be performed in the inlet channel prior to separation. Additionally, the reaction can, in some embodiments, be performed or continued in the processing channel if necessary or desired as might be the case with a precipitation, flocculation, or crystallization reaction. One or more of the intersecting channels can also be used as an output to collect particles repelled or otherwise prevented from entering the separation channel. FIG. 2A illustrates a fluidic concentrating device with a magnet component substantially aligned along the X-axis at the top of the processing channel. The nonlinear portion of the inlet channel is at about 90° relative to the substantially linear portion of the inlet channel. FIG. 2B illustrates a similar embodiment with the magnet component aligned substantially linear at the bottom of the processing channel and the nonlinearly aligned portion of the inlet channel is at about 270° relative to the substantially linear portion of the inlet channel. FIG. 2C illustrates an embodiment as in FIG. 2A with the magnet component aligned along the bottom of the processing channel. FIG. 2D illustrates an embodiment similar to FIG. 2B with the magnet component aligned along the bottom of the processing channel. In the embodiments in FIG. 2A-D, the nonlinearly aligned inlet channel portion is at about either 90° (FIGS. 2B, 2D) or at about 270° (FIGS. 2A, 2C) relative to the substantially linear portion of the inlet channel, the angle θ can be determined by device requirements wherein θ≠4°, θ≠180° and θ≥30°, θ≥45°, θ≥70°, θ≥90°, is ≥100°, is ≥135°, is ≥140°, is ≥165°, is >180°, is ≥205°, is ≥225°, is ≥250°, is ≥280°, is ≥300°, or is ≤330° relative to the X-axis and/or any angle, theta (θ), relative independently to the Y- and Z-axis. For example, FIG. 2E illustrates a plan view where θ(x)=90°, θ(y)=180°, θ(z)=0°. FIG. 2F illustrates a plan view where θ(x)=90°, θ(y)=225°, θ(z)=0°.

FIG. 3A-D illustrate embodiments similar to those of FIG. 2A-D wherein a magnet component 107 extends into the inlet region.

FIG. 4A-D illustrate embodiments of a fluidic concentrating device with a further component (401) that is an annular or toroidal magnet component (ring magnet) surrounding the inlet channel. The ring magnet may comprise one or more magnets positioned in a repelling orientation relative to their magnetic poles, thereby resulting in a symmetric magnetic force along the X-axis of the inlet channel. In one embodiment, the ring magnet comprises a plurality of rectangular magnets configured around the inlet such that the individual repelling fields are aligned within the inlet channel. The force exerting from the ring magnet slows down the particle flow rate by providing a repulsive force to the paramagnetic property of the particles. The ring magnet can be configured in the substantially linear portion of the inlet channel as shown in FIG. 4A with a magnet component substantially aligned along the X-axis of the top of the processing channel and as illustrated in FIG. 4B with a magnet component substantially aligned along the X-axis of the bottom of the processing channel. FIG. 4C illustrates the configuration of FIG. 4A with an additional magnet component or portion (107) extending beyond the processing channel and into the inlet portion. FIG. 4D illustrates the ring magnet configured surrounding an inlet portion of a fluidic concentration device without a magnet component aligned along an axis of the processing channel. Though as illustrated as 401 surrounding the linear portion of the inlet channel in FIG. 4A-D, these embodiments are nonlimiting and the ring magnet may be placed, in other embodiments anywhere along the inlet channel including the nonlinearly aligned portion of the inlet channel.

FIG. 5A-D illustrates embodiments with single magnet components substantially aligned along the top or bottom of the X-axis of the processing channel further comprising ring magnet 401 and nonlinearly aligned inlet channel portions and intersecting channels. One or more of the intersecting channels can also be used as an output to collect particles repelled or otherwise prevented from entering the separation channel.

Many of the embodiments of the particle concentrating device comprise a single magnet component substantially aligned along either the top or bottom of the X-axis of the processing channel. Other embodiments described herein have no magnet component aligned along a substantial portion of the processing channel. In other embodiments, the device may comprise multiple magnet components substantially aligned along top and bottom of the X-axis of the processing channel. Such embodiments provide for magnetic levitation of paramagnetic particles within the channel and thus separation of heterogeneous particles within the processing channel. In accordance with an embodiment, the levitation device includes an upper magnet or a lower magnet that comprises a plurality of magnets that are movably mounted such that the number of magnets that are engaged (i.e., actively creating a magnetic field across the processing section of the fluidic channel) may be controlled, thereby controlling the magnitude and gradient profiles of the magnetic field. Control over the magnetic field as a function of time permits more complex protocols which can be changed at any time during an experiment or assay. Among other advantages over a static system, this permits: more flexible partitioning of samples; higher resolution in the separation of particles; more flexible methods to purge, prime and treat the fluidic paths; and feedback to optimize or change the separation parameters at the time of running an experiment or assay.

In accordance with an embodiment, the upper magnet and the lower magnet comprise elongated rectangular magnets (preferably bar magnets), whose dimensions range from a height (y-axis from (vertical axis)) of about 2-mm to about 25 mm, a width (x-axis from) of about 30 mm to about 80 mm, or to about 95 mm, and a depth (z-axis from) of about 0.5 mm to about 7 mm. Preferably, upper magnet and lower magnet have dimensions ranging from a height (y-axis from) of about 4 mm to about 20 mm, a width (x-axis from) of about 40 mm to about 60 mm, and a depth (z-axis from) of about 1 mm to about 3 mm. The preferred magnet sizes described herein may be achieved by one magnet or by combining multiple magnets. In accordance with an embodiment, depth and the width of upper magnet and lower magnet are substantially the same. In accordance with an embodiment, the height of upper magnet is at least about 25%, 50%, 75%, 100%, 125%, 150%, 175%, 200%, 225%, 250%, 275%, 300%, 325%, 350%, 375%, 400%, 425%, 450%, 475%, or 500% larger than the height of lower magnet. In accordance with an embodiment, the height of upper magnet is about 25% to about 100%, about 100% to about 200%, about 200% to about 300%, about 300% to about 400%, about 400% to about 500%, or about 500% to about 600% larger than the height of lower magnet. In accordance with an embodiment, the height of lower magnet is at least about 25%, 50%, 75%, 100%, 125%, 150%, 175%, 200%, 225%, 250%, 275%, 300%, 325%, 350%, 375%, 400%, 425%, 450%, 475%, or 500% larger than the height of upper magnet. In accordance with an embodiment, the height of lower magnet is about 25% to about 100%, about 100% to about 200%, about 200% to about 300%, about 300% to about 400%, about 400% to about 500%, or about 500% to about 600% larger than the height of upper magnet.

In accordance with an embodiment, the distance between the upper and lower magnets and the fluidic channel, capillary or central processing section along the vertical axis is at least about 1 micron, 10 microns, 50 microns, or 100 microns and/or is no greater than about 500 microns, 1 mm, 2 mm, 3 mm, 4 mm, or 5 mm. In accordance with an embodiment, the distance between either of the magnets and the fluidic processing channel is between about 1 micron to about 5 mm along the vertical axis, and preferably about 10 microns to about 2 mm.

In accordance with an embodiment, the vertical distance between the upper magnet and the fluidic processing channel is at least about 25%, 50%, 75%, 100%, 125%, 150%, 175%, 200%, 225%, 250%, 275%, 300%, 325%, 350%, 375%, 400%, 425%, 450%, 475%, or 500% greater than the vertical distance between lower magnet and the fluidic processing channel. In accordance with an embodiment, the vertical distance between the upper magnet and the fluidic processing channel is at least about 25% to about 100%, about 100% to about 200%, about 200% to about 300%, about 300% to about 400%, about 400% to about 500%, or about 500% to about 600% greater than the vertical distance between the lower magnet and the fluidic processing channel.

In accordance with an embodiment, the vertical distance between the lower magnet and the fluidic processing channel is at least about 25%, 50%, 75%, 100%, 125%, 150%, 175%, 200%, 225%, 250%, 275%, 300%, 325%, 350%, 375%, 400%, 425%, 450%, 475%, or 500% greater than the vertical distance between upper magnet and the fluidic processing channel. In accordance with an embodiment, the vertical distance between the lower magnet and the fluidic processing channel is at least about 25% to about 100%, about 100% to about 200%, about 200% to about 300%, about 300% to about 400%, about 400% to about 500%, or about 500% to about 600% greater than the vertical distance between the upper magnet and the fluidic processing channel.

In accordance with an embodiment, upper magnet and lower magnet are permanent magnets or electromagnets. In accordance with an embodiment, the maximum energy product of upper magnet and lower magnet ranges from about 1 Mega-Gauss Oersted to about 1000 Mega-Gauss Oersted, and more preferably ranges from about 10 Mega-Gauss Oersted to about 100 Mega-Gauss Oersted. In accordance with an embodiment, the surface field strength of upper and lower magnets ranges from about 0.1 Tesla to about 100 Tesla, and more preferably ranges from about 1 Tesla to about 10 Tesla. In accordance with an embodiment, the remanence of upper and lower magnets ranges from about 0.5 Tesla to about 5 Tesla, and more preferably ranges from about 1 Tesla to about 3 Tesla.

In accordance with a preferred embodiment, an asymmetric magnetic field is achieved by using a stronger magnetic material on one side of a processing channel and a weaker magnetic material on the opposite side of the processing channel. In accordance with a preferred embodiment, an asymmetric magnetic field is achieved by using a magnetic material on one side of a fluidic channel and a substantially similar magnetic material on the opposite side of the fluidic channel. In accordance with such embodiment, upper magnet and lower magnet may be substantially the same size. In accordance with such embodiment, upper magnet may comprise an alloy of neodymium and iron, lower magnet may comprise samarium-cobalt, and wherein both magnets are substantially the same size. Alternatively, upper magnet may comprise samarium-cobalt, lower magnet may comprise neodymium, and wherein both magnets are substantially the same size.

In accordance with an embodiment, alterative magnet configurations may be used. Referring to, the device in accordance with the present invention may include multiple upper magnets and multiple lower magnet positioned around a fluidic channel. Upper magnets may include an anterior upper magnet, a central upper magnet, and a posterior upper magnet. Lower magnets may include an anterior lower magnet, a central lower magnet, and a posterior lower magnet.

In accordance with another magnet configuration, the device may include an anterior upper magnet, a posterior upper magnet, an anterior lower magnet, and a posterior lower magnet, wherein the magnets are positioned around fluidic channel. The anterior upper magnet and the posterior lower magnet are positioned in a magnetic repelling orientation. Descriptions of asymmetrical magnetic levitation devices are further described in International Patent Application PCT/US19/24138 which is incorporated herein by reference.

FIG. 7A-D illustrate embodiments of the dual magnet component particle concentrating device with optional ring magnet 401 and optional inlet channel portions, 201, 202, and 203 in exemplary orientations.

Certain embodiments of the particle concentrating device described herein have no magnet component aligned along a substantial portion of the processing channel. Particle concentration is achieved through a combination of sedimentation and optionally preconcentration of particles in the inlet channel through surmountable magnetic repulsion of particles within the inlet channel and through flow-mediated preconcentration that may optionally be enhanced through inlet channel geometry. FIG. 8A-D illustrates embodiments of device configurations. FIG. 8E-H illustrates the incorporation of inlet channel valves (801, 802, 803) controlling movement of fluid to optional intersecting channel(s). A pump (804) may be associated with any channel, inlet, inlet intersecting, outlet, diverting, etc. The pump, as further described herein, may be configured in various embodiments to provide positive or negative pressure as required to drive fluids in the corresponding channel and cumulative flow when operated in multiple pumps associated with channels in fluidic communication. FIG. 8H illustrates a particle concentrating device with inlet intersecting channels 805 and 806. As shown in FIG. 8H, an inlet channel intersecting channel may be upstream, downstream, or both of the ring magnet. In an embodiment, an intersecting channel (806) is provided only in the portion of the inlet channel that is substantially linear to the processing channel that is upstream of the ring magnet.

FIG. 9 illustrates an embodiment of a single magnet component particle concentration device. FIG. 9A illustrates particle concentrator device with a pump (804) driving flow from the inlet channel into the processing channel. FIG. 9B illustrates a particle concentration device with a plurality of pumps (804) individually controlling flow rate of outlet channels. The combined flow rates are additive for the flow in the processing and inlet channel. Flowrates can range from 0.1 µL to 1 mL per minute depending on sample fluid characteristics such as viscosity and particle concentration and inlet channel, processing channel, and outlet channel dimensions and configuration. In a preferred embodiment, processing channel and outlet channel flowrates may be from about 0.2 µL per minute to about 200 µL per minute, or from about 0.5 µL per minute to about 40 µL per minute. Concentration can also be performed under stop-flow or intermittent-flow operation. Valve (902) can be actuated divert the outlet channel into an outlet port (903) or (904).

In some embodiments, inlet channel pump(s) and outlet channel pump(s) are employed in either a positive or negative pressure configuration, respectively in relation to the to the processing channel. Under stop-flow conditions, the separation of the sample is performed and the sample is removed into separate outlet channels by resuming flow within the processing channel.

In accordance with the present invention, the device may include one or more pumps to drive fluid through the device. "Pump" is used to refer to any device which applies a difference in pressure between different locations in the device. Pumps may be placed on either the inlet side of the system (pushing fluid toward the outlet(s)), or on the outlets (pulling liquid from the inlet(s)), or a combination of both. The difference in pressure may be positive or negative. The pressure difference may be applied in common across multiple outlets or inlets, or may by arranged such that each outlet or inlet has a directly-applied pressure difference. Pressure differentials may be applied, in some embodiments, to overcome particle preconcentration forces, magnetic, sedimentary, or a combination of forces in the inlet channel. The pumps may be variable to allow control of the applied pressure difference. Pump types include, but are not limited to: positive displacement pumps such as syringe pumps; peristaltic pumps; diaphragm pumps; regulated static pressure sources; gravitationally-controlled pressure sources such as elevated or lowered volumes of liquid; and manual sources of pressure such as plastic or foil blisters.

In some embodiments, a pump may be included on inlet line(s) to generally drive fluid through the channel structure, and also included on certain outlet channels or ports to drive fluid through directed outlet lines. For example, pumps may be included on one or more outlet lines associated with the particle enriched or particle depleted layer height or heights of one or more particles of interest. In addition, all outlet lines may include a variable pump that may be activated or deactivated based on the anticipated flow stream height or heights of one or more particles of interest. Similarly, external pumps may be controlled to provide a variable pressure differential. Embodiments may further comprise additional components including: a receptacle for holding one or more outlet collection tubes; a receptacle for holding one or more input tubes; a component comprising a receptacle for one or more tubes which is temperature-controlled, for example a cold plate which stores one or more outlet tubes at a temperature close to 4° Centigrade; or a microplate holder, which may include positioning means to couple inlets or outlets to wells in the microplate. In an embodiment, an outlet channel or port is fluidically coupled to a pipetting robot. The pipetting robot may be integrated with the particle concentration device to selectively dispense aliquots or fractions of a concentrated particle population from the processing channel and alternatively, or additionally, dispense aliquots or fractions of a particle depleted effluent from the processing channel. The device may also be integrated with a microprocessor or computer that is programed to record, analyze, and/or control the fluid and/or particle flow and separation through the device.

Figure 10:
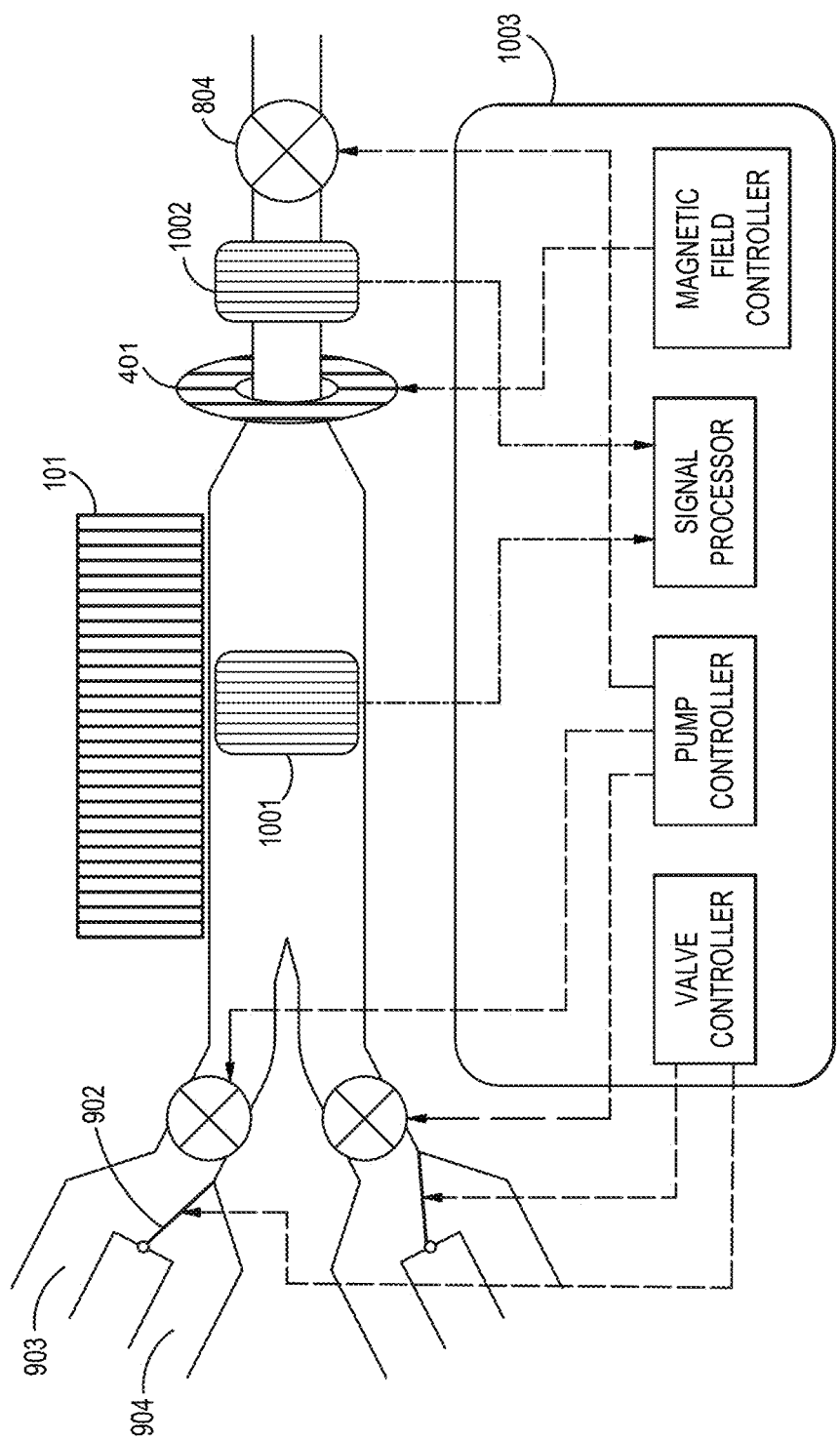
FIG. 10 is a diagram of an integrated system according to various embodiments as described herein.

FIG. 10 illustrates a particle concentration system comprising an exemplary particle concentration device. The device may further comprise one or more sensors. For example, a processing channel sensor (1001) and inlet channel sensor (1002) can be implemented into the system. A system integrator (1003) can comprise a signal processor to receive signals from sensors (1001) and (1002) and through preprogrammed or programmable commands, control other components such as inlet pump(s) (804) or outlet channel pumps, magnetic field of ring magnet (401) or other electromagnetic components, valves or other interfacing devices or components. A sensor is selected from an optical sensor, capacitive sensor, conductive sensor, thermal sensor, flowrate sensor, ultrasonic sensor, gravimetric sensor, magnetic field sensor, or combinations thereof. In embodiments, the sensor is a photodetector, a multipixel imaging detector, a magnetic field detector, an electrochemical detector, an optical phase detector, a scatter detector, a Hall sensor, a magnetoresistive sensor, a bolometric sensor, surface acoustic wave sensor, a biosensor, or combinations thereof. Sensors may be further comprise one or more sensors inside, or adjacent to, portions of the processing channel or inlet channel to detect presence or absence or quantity of particles or other physical or chemical properties of the particles or sample flow stream.

Figure 18:
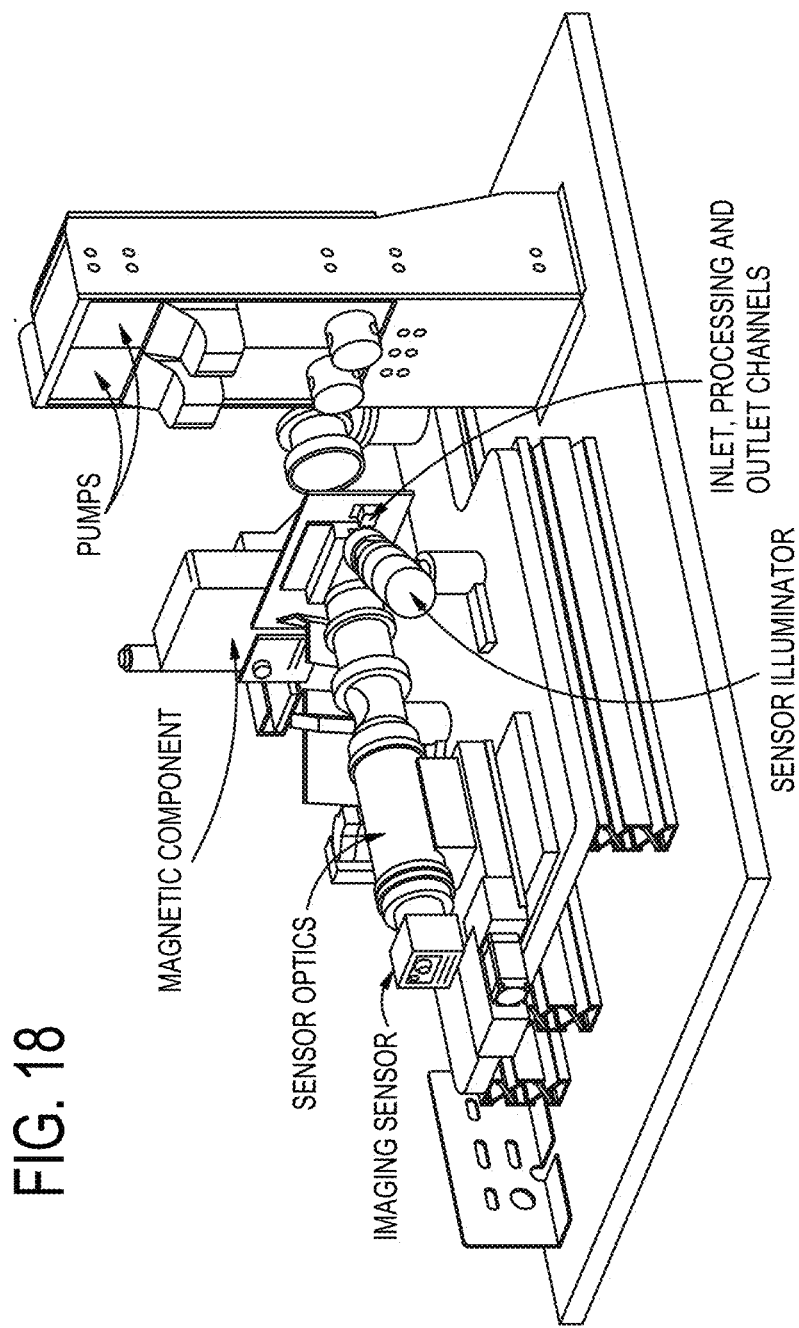
FIG. 18 is a perspective view of an embodiment of a particle concentrating and isolating device as described herein.
Figure 20A:
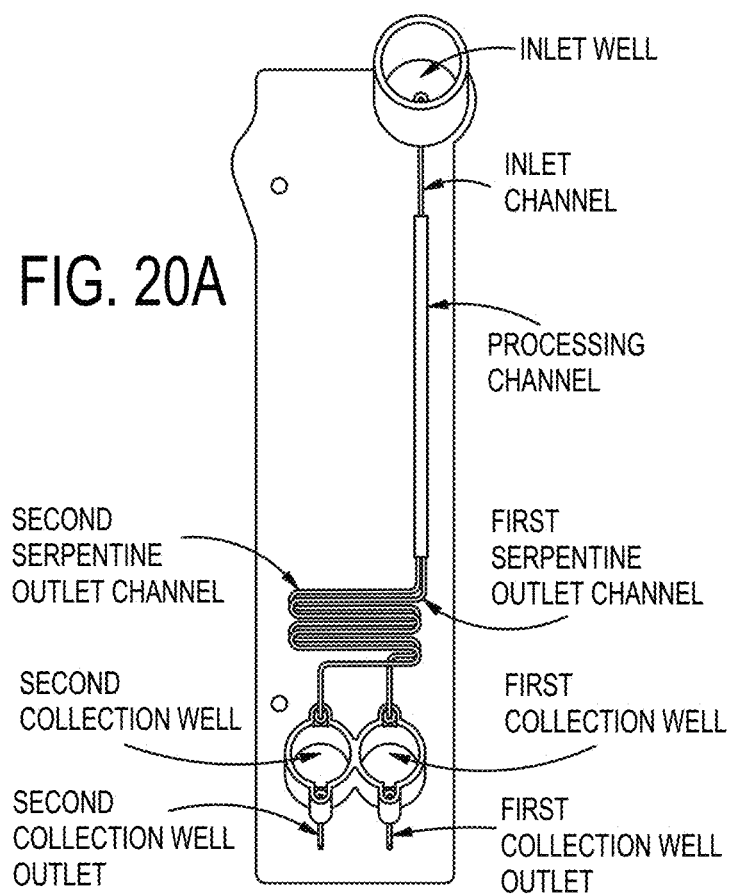
FIG. 20 is a detailed view of an example flowcell cartridge showing the top side and bottom side of the planar substrate.
Figure 20B:
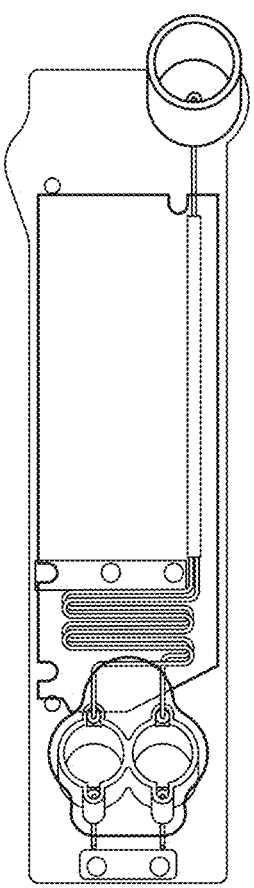
Figure 21A:
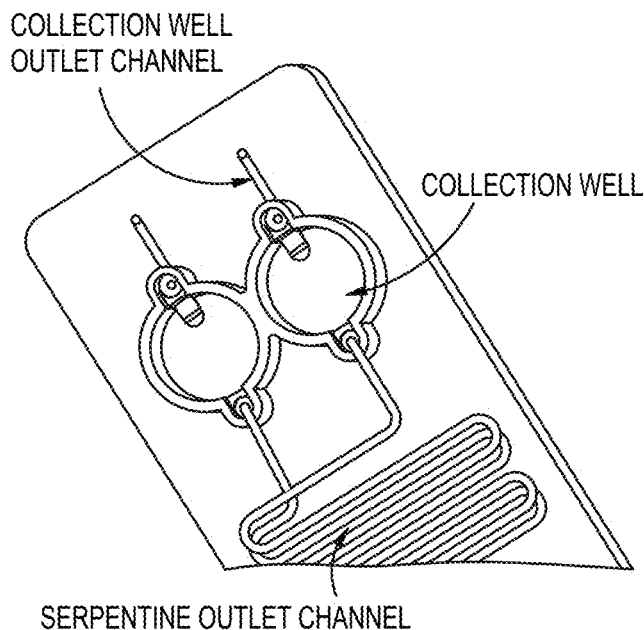
FIGS. 21A-21B show example configurations of a collection well.
Figure 21B:
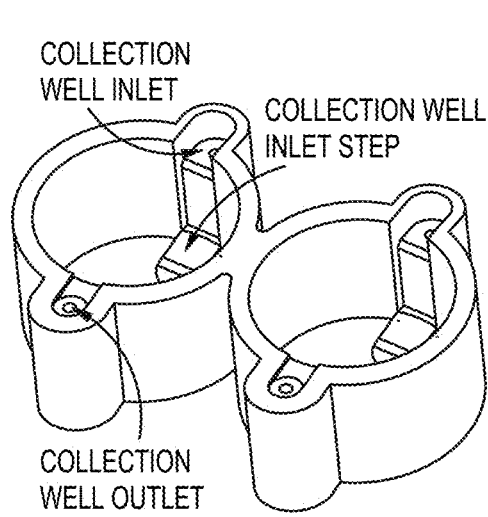
Figure 22A:
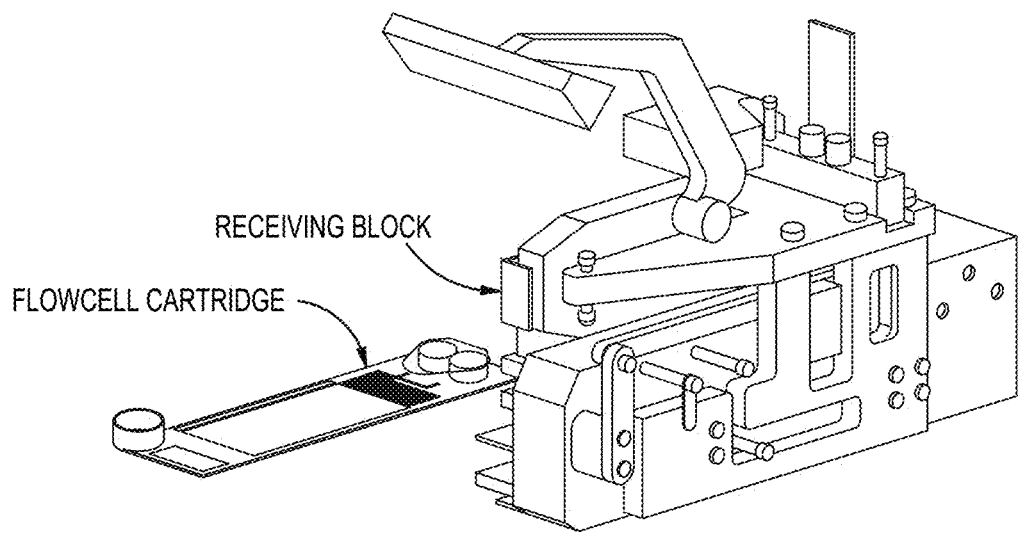
FIGS. 22A-22B shows an example of a system receiving block and the orientation of an example flowcell with respect to a plurality of magnetic components.
Figure 22B:
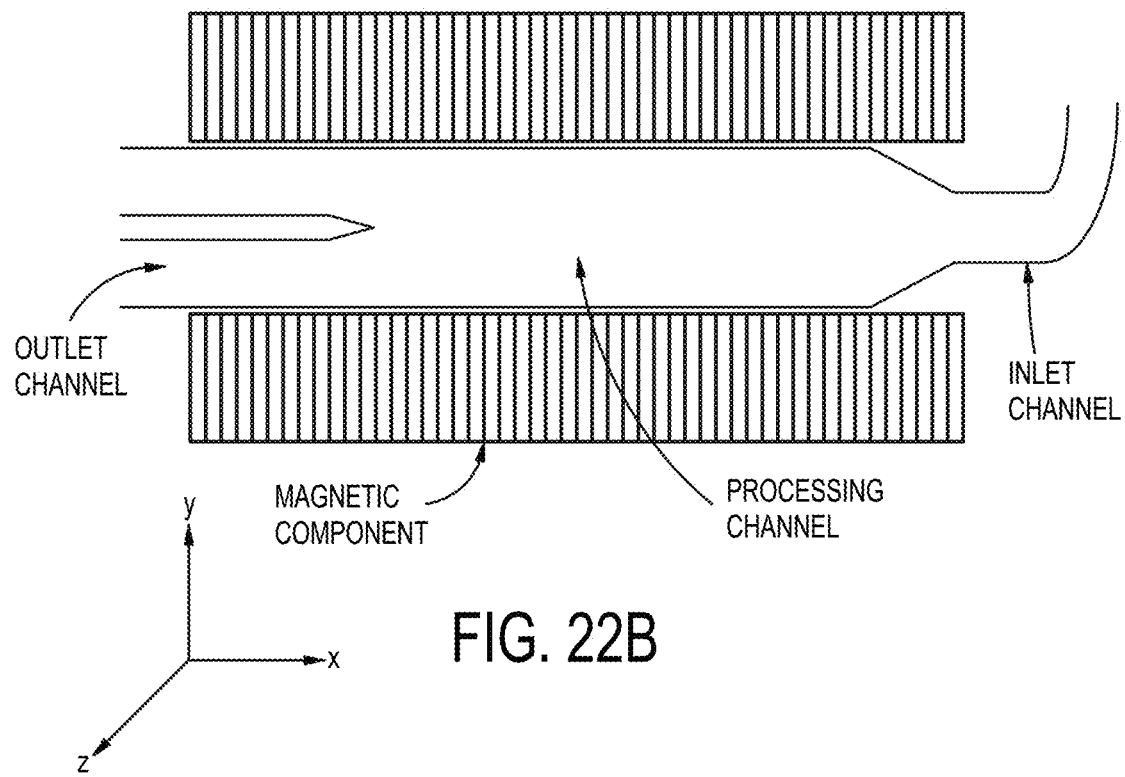
Figure 23:
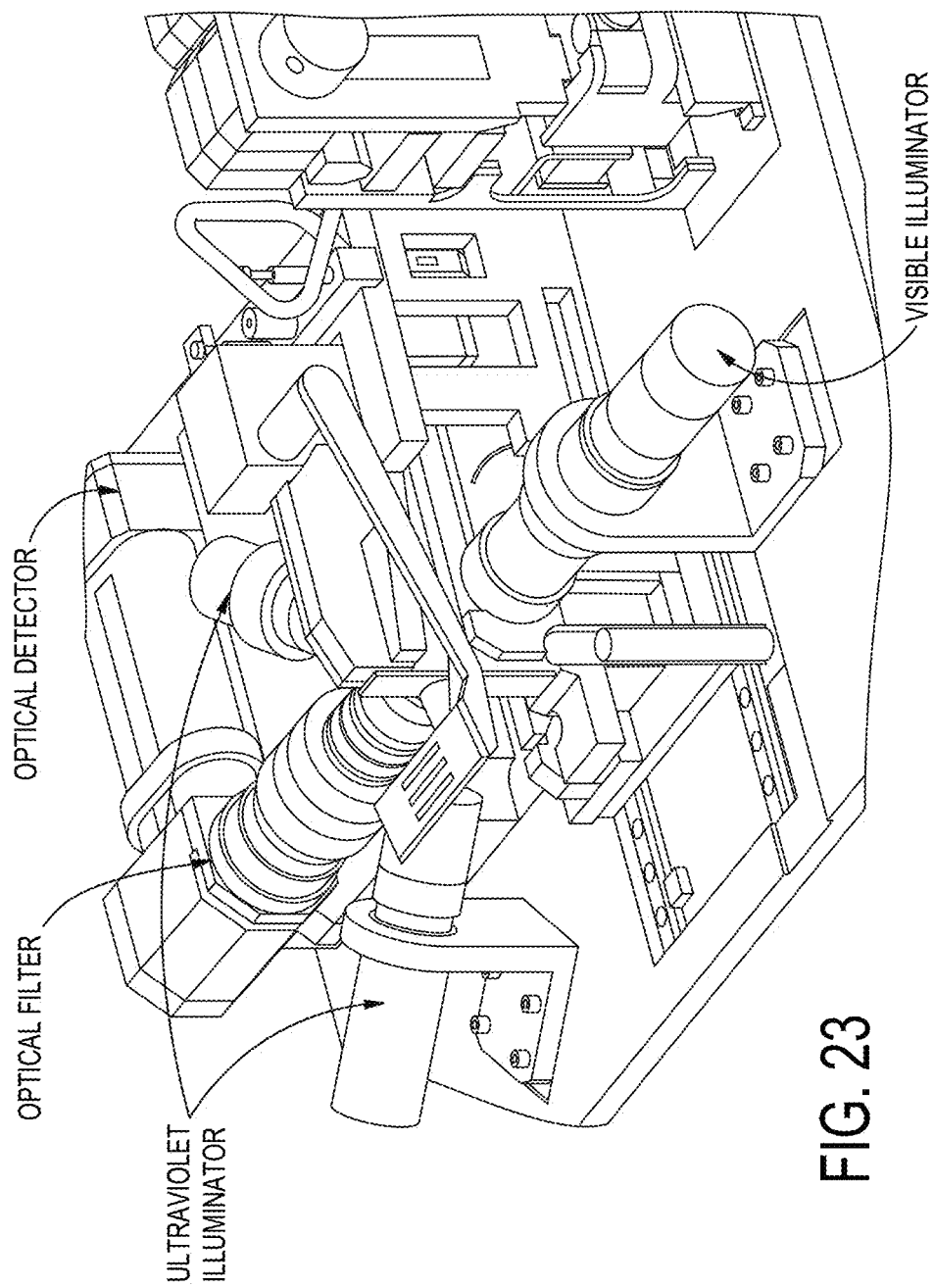
FIG. 23 shows an example of an optical system in orientation with an example receiving block.
Figure 24A:
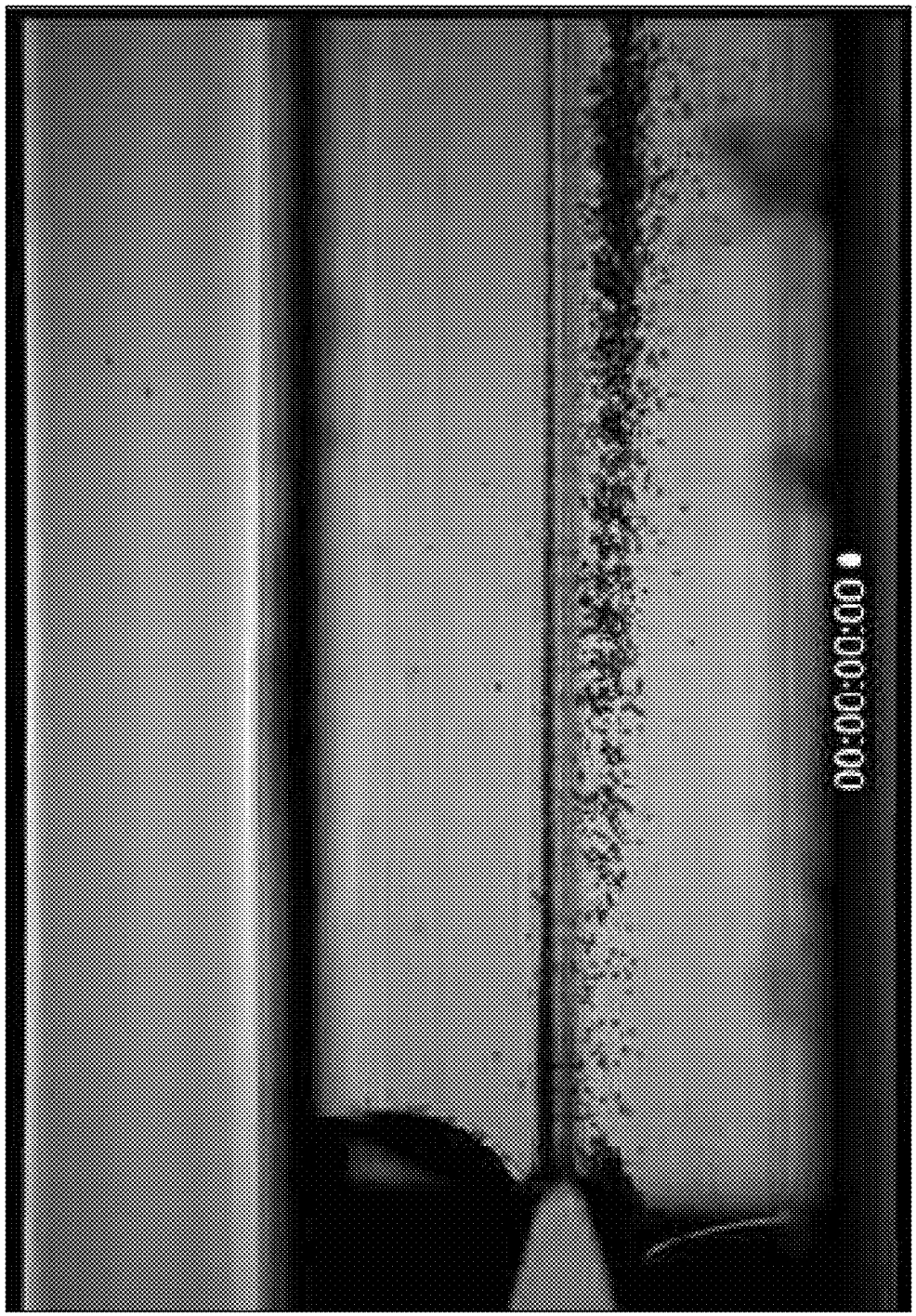
FIGS. 24A and 24B show an image of an example particle separation and stability of output channel pressure, respectively.
Figure 24B:
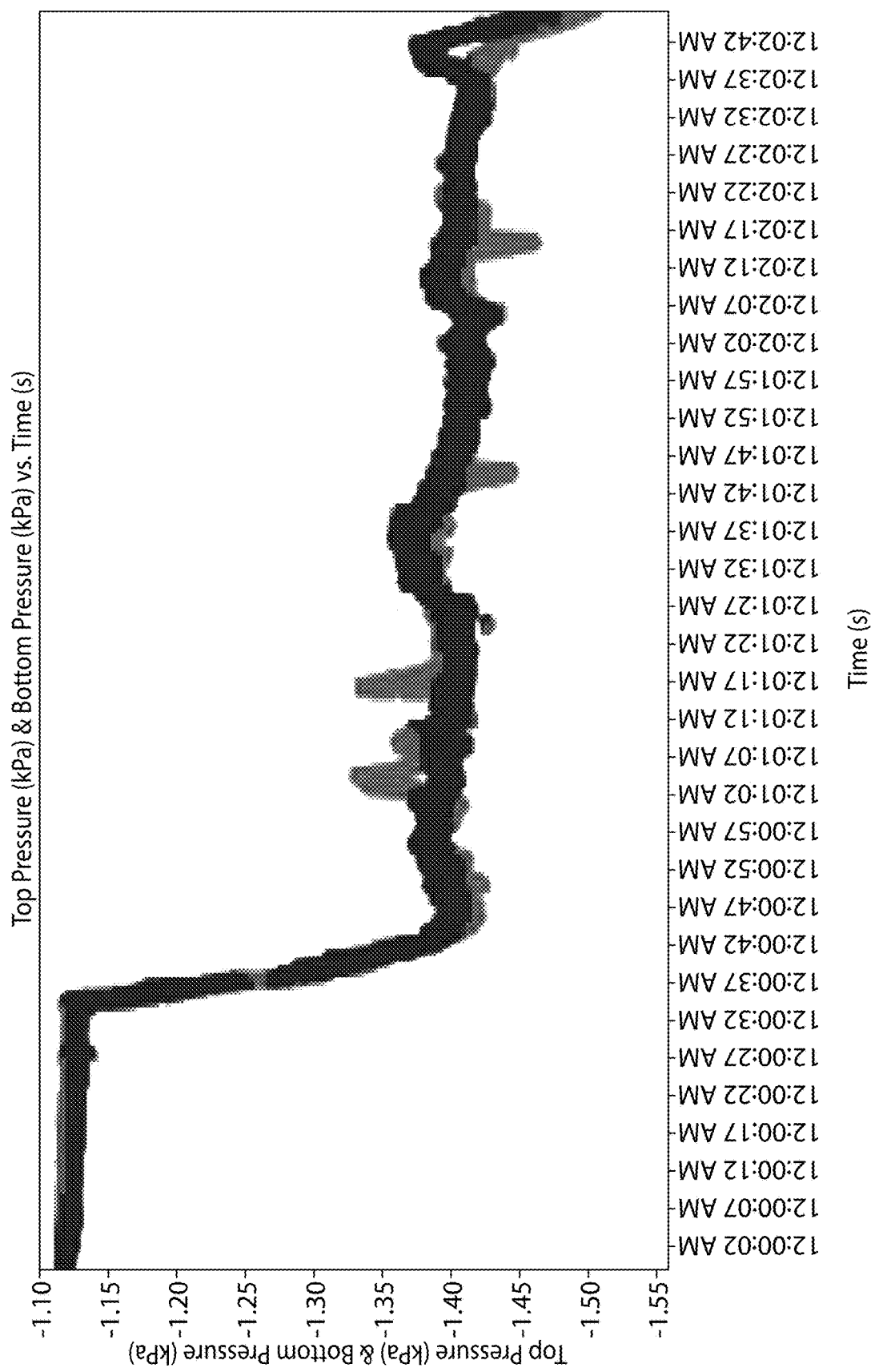

As illustrated in the plan view of particle concentrating device in FIG. 18, the device may further comprises a visualization component or imaging sensor, a sensor illuminator, and sensor optics. Visualization component may comprise any device which enables or enhances the ability to view in real time and/or to record particles as they pass through processing channel, thereby enabling observation and/or measurement of the isolation of the particles, including the extent of particle isolation and/or the rate of particle isolation. Visualization may also include analysis of the size, shape, or other characteristics of the particles and/or other components of the sample. In accordance with an embodiment, the material used to surround and thereby define the processing channel is clear or transparent along at least a segment of the processing channel to facilitate observation of particles passing therethrough. The visualization system may employ optics to allow bright-field illumination, dark-field illumination, and/or fluorescent detection of sample components.

In an embodiment, the device comprises two optically clear or transparent channel segments, with each on opposite sides of channel. In accordance with this embodiment, the visualization component is positioned on one side and focused through one of said clear or transparent segments, and an illumination component positioned on the opposite side and focused through the second of said clear or transparent segments. The illumination component is configured to provide sufficient light to facilitate the visualization of the particles within processing channel by the visualization component. In another embodiment, the device includes one clear or transparent segment, on one side of channel. In accordance with this embodiment, the visualization component is positioned on one side and focused through said clear or transparent segment, and an illumination component positioned on the same side and focused through said clear or transparent segments. The illumination component is configured to provide sufficient light to facilitate the visualization of the particles within processing channel by the visualization component.

In a preferred embodiment the illumination system is a source of visible or ultraviolet light. The illumination source can be configured to illuminate a sample in an optically transparent flow channel, including a processing channel, wherein the light is transmitted the flow channel to an optical sensor opposite the illumination source. In an embodiment, the illumination source is angularly adjacent to the optical sensor so that light from the optical source is reflected from the sample in the flow channel into the optical sensor. In an embodiment, the optical source is a source of ultraviolet light and is constructed and arranged to illuminate the sample within a flow channel such that visible light from natural florescence of artificial florescence associated with the sample is detected by the optical sensor.

V. Particle Isolation and Concentration Methods

Organic or inorganic particles may be concentrated by the methods of the present invention. The particles may be biological entities such as cells, cell fragments, organelles, clusters, tissue, tissue components, microorganisms including bacteria, fungi (yeasts and molds), viruses, protozoa, and algae and fragments, organelles, clusters, and other components thereof. Particles can be macromolecules, complexes, chelates, conjugates, crystals, amorphous solids, gels, coagulates, and the like. DNA, RNA, proteins, are concentratable under methods of the present invention. Beads, shells, nanoparticles, laminates, and precipitates and coprecipitates may likewise be concentrated. Numerous applications require the isolation of particles, including applications requiring the separation of like particles from other particles, identification of particles, and the treatment or otherwise manipulation of particles. Such applications include, but are not limited to, separating live and dead cells, isolation and/or treatment of circulating tumor cells, emulsion PCR enrichment, production of plasma such as platelet rich plasma, isolating sperm for specific traits such as gender selection, bacterial load testing, antibiotic resistance testing, identification of sepsis or blood contamination, immune cell isolation, compound screening, exosome separation, or extracellular vesicles separation. The particle isolation methods of the present invention may be utilized in any of these applications.

Particles present in a sample medium are concentrated in a particle concentrating device under conditions that substantially enrich particle concentration and substantially deplete a layer of sample medium. Sample medium with heterogeneous particle populations may be selectively enriched based on size, density, and paramagnetic heterogeneity and selective orientation of magnetic forces and processing channel flow rates. The heterogeneous population of particles may be derived from biological samples. In some cases, the biological samples are, as illustrating examples, a bodily fluid including blood, saliva, urine. sperm, plasma. serum, and stool; swabs including skin, anal, nasal and vaginal swabs or environmental swabs from a door handle; and proximal fluids including tears, lavage fluid from lungs, or interstitial tissue fluids from a breast. In some cases, the biological samples are. as illustrating examples, live and dead cells, circulating tumor cells, nucleic acids, nucleotides, amino acids, peptides, proteins. antigens, antibodies, or immune cells (e.g., white blood cells, T cells. phagocytic cells). In some cases, the biological samples are. as illustrating examples, a biomolecule, cell, protein, lipid, carbohydrate, microorganism, virus, viron, or bacteria.

Level of concentration of the particle enriched fraction over particle concentration in the sample medium is at least 30%, preferably 40%, 50%, 60%, 70%, 80%, 90%, 95%, or 99%. In an embodiment, the particle depleted fraction is substantially free of particles.

Prior to introduction into the processing channel, reagent fluids or gases may be introduced into the flow stream prior to, concurrently with, or subsequent to the passage of a sample medium along a position containing an intersecting channel. In one embodiment, a paramagnetic medium, buffer, flocculating agent, sample preconditioning reagent or reactant may be introduced and mixed into the sample medium a preparation for concentration or isolation or analysis in the processing channel.

Particles are introduced into a processing channel at a flow rate and subjected to sedimentation and/or magnetic repulsion and/or attraction within the processing channel to form particle enriched and particle depleted layers within the flow stream. In various embodiments, the formation of particle enriched and particle depleted layers within the flow stream occur under continuous flow, stop flow, or intermittent flow conditions. Collection of the particle enriched and/or particle depleted layers is performed as the layers are split in the processing channel flow stream. Flowing output from the processing channel, the particle enriched streams and/or the particle depleted streams may be selectively channeled for aliquoting or fractionation. Once the particles of interest reach their equilibrium (or near equilibrium) height in a flow layer within the processing channel, they pass a splitter that divides the processing solution into multiple fractions. Because the particles of interest are geometrically isolated within the processing solution, substantially all the particle of interest are retained within the effluent of certain geometric fractions. The geometric effluent fraction or fractions containing the particles of interest are then collected and may be recombined if the particles of interest are present more than one fraction, thereby isolating the particles of interest. In some embodiments it may be necessary to separate the cells from the paramagnetic medium. This may be done through dilution if separation of the cells from the paramagnetic medium is desired.

Alternatively, the division of sample solution into each effluent fraction may be achieved by increasing or decreasing the fluid flow toward individual outlets, such that the ratio of division can be modified. In accordance with an embodiment the ratio may be modified by up to 50%. For example, if the splitter comprises two channels with equal cross-section, the geometric ratio of division is 1:1. By withdrawing a larger (or smaller) amount of fluid into one fraction through the application of a larger (or smaller) pumping rate than is applied to the other fraction, the ratio of division can be altered, e.g. to about 3:1, 4:1, 5:1, 6:1, 7:1, 8:1, 9:1, or 10:1. In a preferred embodiment, the division for such geometric ratio would be within the range of about 2:1 to about 1:2. In a further preferred embodiment, the division for such geometric ratio would be within the range of about 10:1 to about 1:10. The division could be about 1:10, about 1:9.5, about 1:9, about 1:8.5, about 1:8, about 1:7.5, about 1:7, about 1:6.5, about 1:6, about 1:5.5, about 1:5 about 1:4.5, about 1:4 about 1:3.5, about 1:3, about 1:2.5, about 1:2, about 1:1.5, about 1:1, about 1.5:1, about 2:1, about 2.5:1, about 3:1, about 3.5:1, about 4:1, about 4.5:1, about 5:1, about 5:5, about 5.5:1, about 6:1, about 6.5:1, about 7:1, about 7.5:1, about 8:1, about 8.5:1, about 9:1, about 9.5:1, about 10:1 each ratio respective of an upper outlet channel flowrate to a lower channel flowrate.

In one embodiment, the sample fluid comprising concentrated particles passes through the fluidic channel at a relatively slow rate until it reaches the tailing end of the processing segment, where the flow rate increases at least 2 times. In a preferred embodiment, the flow rate of the sample fluid increases by at least 4 times at the tailing end of the processing segment. In some cases, the sample fluid is exposed to a magnetic field created by the magnet ring or the pair of upper and lower magnets as described herein. In some cases, the sample fluid is not exposed to a magnet field.

The aliquots or fractions maybe diverted into collecting chambers or containers, such as tubes or plates. The fractions or aliquots maybe subjected to further processing, analysis, or reaction. In an embodiment, the collecting chambers, plates, wells, and/or tubes comprise a pre-determined quantity of a material required or a subsequent processing step, allowing the user to not only concentrate the cells but also to transfer them from one medium to another, or to add a reagent. Exemplary reagents, include but are not limited to, reagents for RNA isolation, DNA isolation, mRNA isolation, protein isolation, growth media, culture media, and fixative. Isolated aliquots and/or fractions may be subjected to further processing comprising magnetic levitation and separation, chemical or biochemical analysis,' fractionation, derivatization, sequencing sample preparation, mass spectral analysis, NMR analysis, microscopic analysis, FACS sorting and analysis, and Xray diffraction analysis. Biological cells may be collected and used in diagnostic or therapeutic procedures in their natural collected state or subjected to genetic or biochemical modification.

During residence in an inlet, processing, or outlet channel, particles may be interrogated for a property including speed, density, biological, chemical, genetic, taxonomy, configuration, viability, concentration, or orientation. The interrogation may be performed with one or more sensors or array of sensors within, adjacent to, or interrogatively linked to an inlet, processing, outlet channel, or combinations thereof, and collection chambers, wells, plates, or tubes. The detected characteristics can be used for independent analysis and can be utilized by a system controller component to control or automate system operation. System components and parameters under control include sample medium flow rate, magnetic field strength, valve actuation for diversion, collection, fractionation, and subsequent reaction conditions. Sensors within the inlet channel are integrated in an embodiment to be operatively linked to the system controller to provide for the automated introduction of reagent fluid or gas into the sample stream in the inlet channel.

FIG. 11 illustrates the concentration of particles utilizing a device of the sample medium through the inlet channel. Sedimentation and/or magnetic repulsive forces concentrate particles in the lower layer of the flow stream and the concentrated particles are collected through the lower outlet channel. The particle depleted layer is collected via the upper outlet channel. This method comprises the steps (i) providing a low volume fluidic device with a processing channel, an inlet channel, and a plurality of outlet channels, (ii) flowing a particle containing sample through the inlet channel into the processing channel under conditions to produce a sample flow stream with at least a particle enriched layer and a particle depleted layer, (iii) flowing the particle enriched layer through a first outlet channel to produce a particle enriched flow stream, (iv) flowing the particle depleted layer through a second outlet channel to produce a particle depleted flow stream, and (v) collecting one or more of the flow streams from one or more of the outlet channels.

FIG. 12 illustrates a flow assisted particle concentration method wherein the inlet channel the inlet channel is further comprised of portion substantially linear to the processing channel and a portion that is nonlinearly aligned to the processing channel connecting at a portion that is angled with an angle, theta (θ). The particle containing sample medium is flowed through the inlet channel at a flowrate sufficient to allow sedimentation within the nonlinearly aligned portion of the inlet channel to concentrate the particles within the inlet channel. Flow of the particle containing sample into the processing channel is maintained to provide for continued or further sedimentation optionally with magnetic repulsion of the particles to form a particle enriched layer and a particle depleted layer of the flow stream. The respective layers of the flow stream are collected at their respective outlet channels. Without being bound to any theory, concentration of particles is presumably due to a combination of the tendency of particles with a density greater than the liquid they are suspended in (e.g., water, solvent) to settle in the presence of gravity, as well as repulsion from the magnetic fields. The particles may be allowed to sediment for at least 1 min, at least 2 min, at least 5 min, at least 10 min, at least 20 min, at least 30 min, or at least 60 min. The particles may be allowed to sediment for at least 10 seconds, at least 20 seconds, at least 30 seconds, at least 40 seconds, at least 50 seconds, at least 60 seconds, at least 100 seconds, or at least 200 seconds. In some embodiments, the concentrated particles pass through the fluidic channel at a flow rate of at most 50 µL/min (microliters per minute), at most 40 µL/min, at most 30 µL/min, at most 20 µL/min, at most 10 µL/min, at most 5 µL/min or at most 2 µL/min. In some embodiments, the concentrated particles pass through the fluidic channel at a flow rate of about 20 µL/min, which will bring the liquid passing through the flow device but allow particles to accumulate outside the magnetic field. In some embodiments, the concentrated particles pass through the fluidic channel at a flow rate of about 10 µL/min, which will bring the liquid passing through the flow device but allow particles to accumulate outside the magnetic field. The liquid passing through the flow cells would be deposited through one of the outlet channels, which lead to the collecting chambers. Once the majority of the liquid has passed through the device and particles are seen to enter the flow cell, the liquid with suspended particles (e.g., suspended cells) would be passed at a higher flow rate into the second output channel, which leads to collecting chambers specific for collecting particles of interest.

FIG. 13 illustrates the flow assisted formation of particle concentration fractions within the processing channel. Concentrated (particle enriched) fractions are collected via the lower outlet channel to provide highly enriched aliquots of the particles. The particle enriched portions of the flow stream may be identified by sensors such as imaging sensors observing particles within the processing channel, or temporally via timed collection of fractions for samples where fractionation patterns within the processing channels are characterized.

FIG. 14 illustrates a preconcentration of particles within the inlet channel by applying a magnetic repulsive force to the particles prior to entry into the processing channel. Entry of the particles into the processing channel is accomplished by discontinuing or reducing the magnetic repulsive force within the channel or by modulating the flow stream to overcome the magnetic repulsive force or a combination of magnetic force reduction and flow stream modulation. Modulation of the flow stream can include an increase in the flowrate of the sample medium flow stream, or fluctuating the flow stream such as by performing a pulsatile inlet channel pressure to provide for introduction of the particles into the processing channel.

FIG. 15 illustrates a method of particle concentration wherein a magnetic component aligned along the X-axis of the processing channel is provided to extend a magnetic repulsive force within the inlet channel to inhibit entry of particles into the processing channel. Flowrate is maintained to provide concentration of particles in the inlet channel. Upon sufficient particle preconcentration, magnetic repulsive forces are overcome and particles are introduced into the processing channel. The degree of preconcentration and is modulated by the flow rate of sample medium. Particles entering the processing channel are sedimented/magnetically repulsed or attracted into the particle enriched layer of the processing channel flow stream and collected in an outlet channel.

Figure 16:
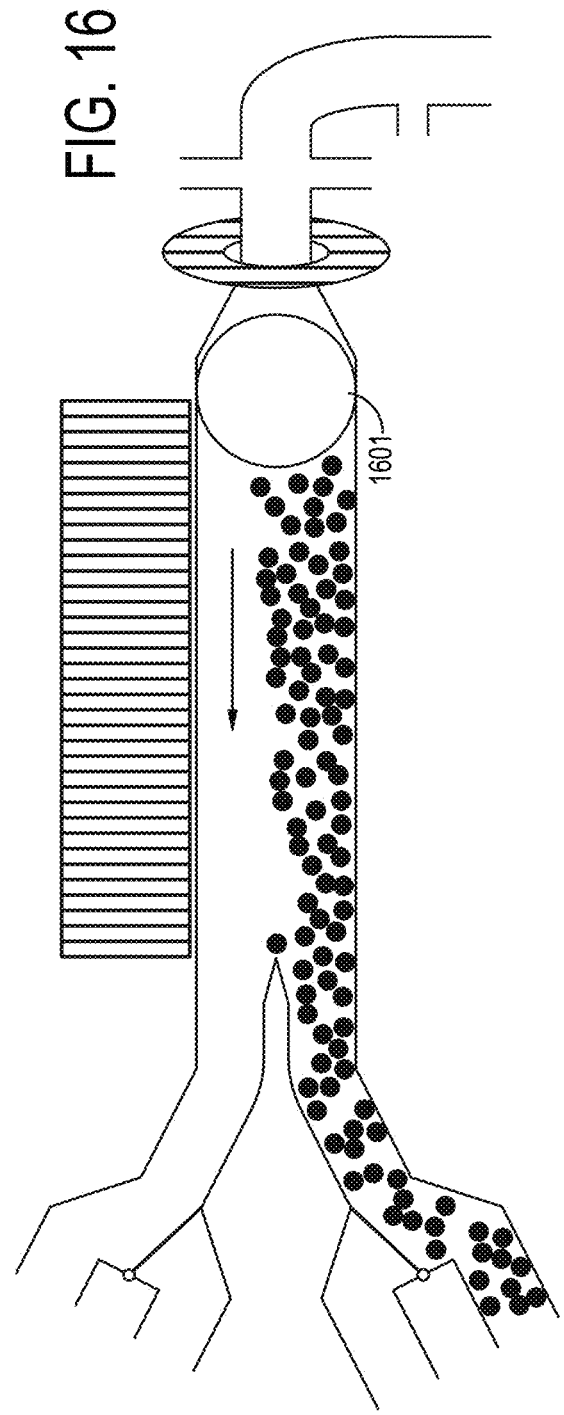
FIG. 16 depicts a meniscus facilitated concentration of a particle-containing sample according to operational embodiments of a particle concentrating and isolating device as described herein.
Figure 19B:
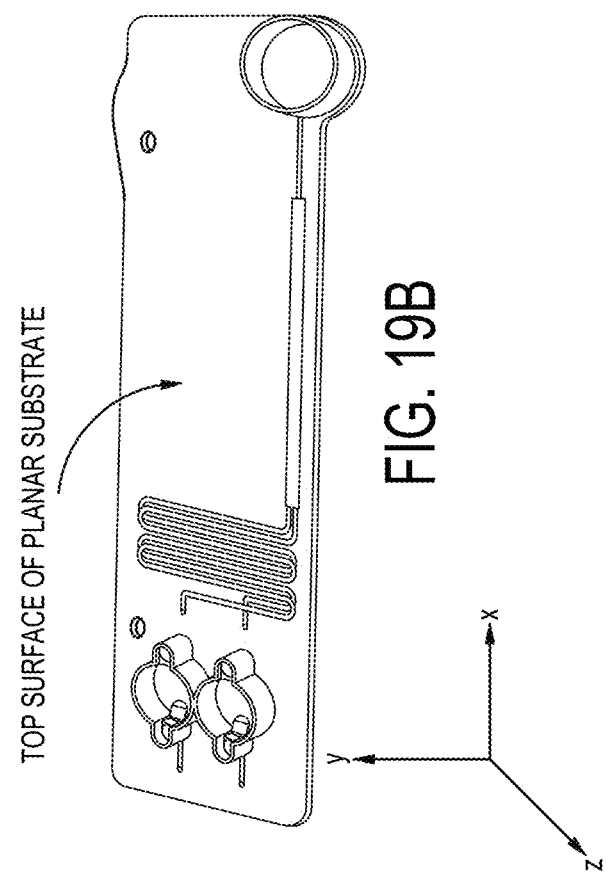
FIGS. 19A-19B are views of an example flowcell cartridge showing the imaging surface on the longitudinal side and the illumination surface on a second longitudinal side.
Figure 19A:
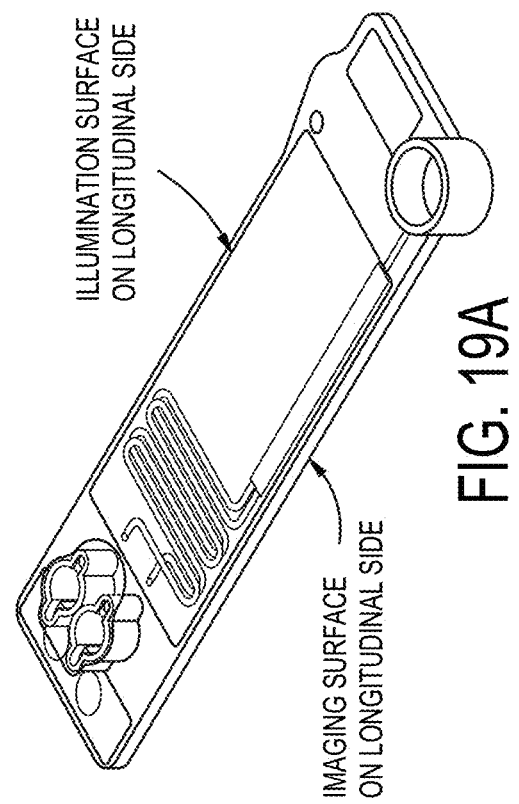
Figure 17:
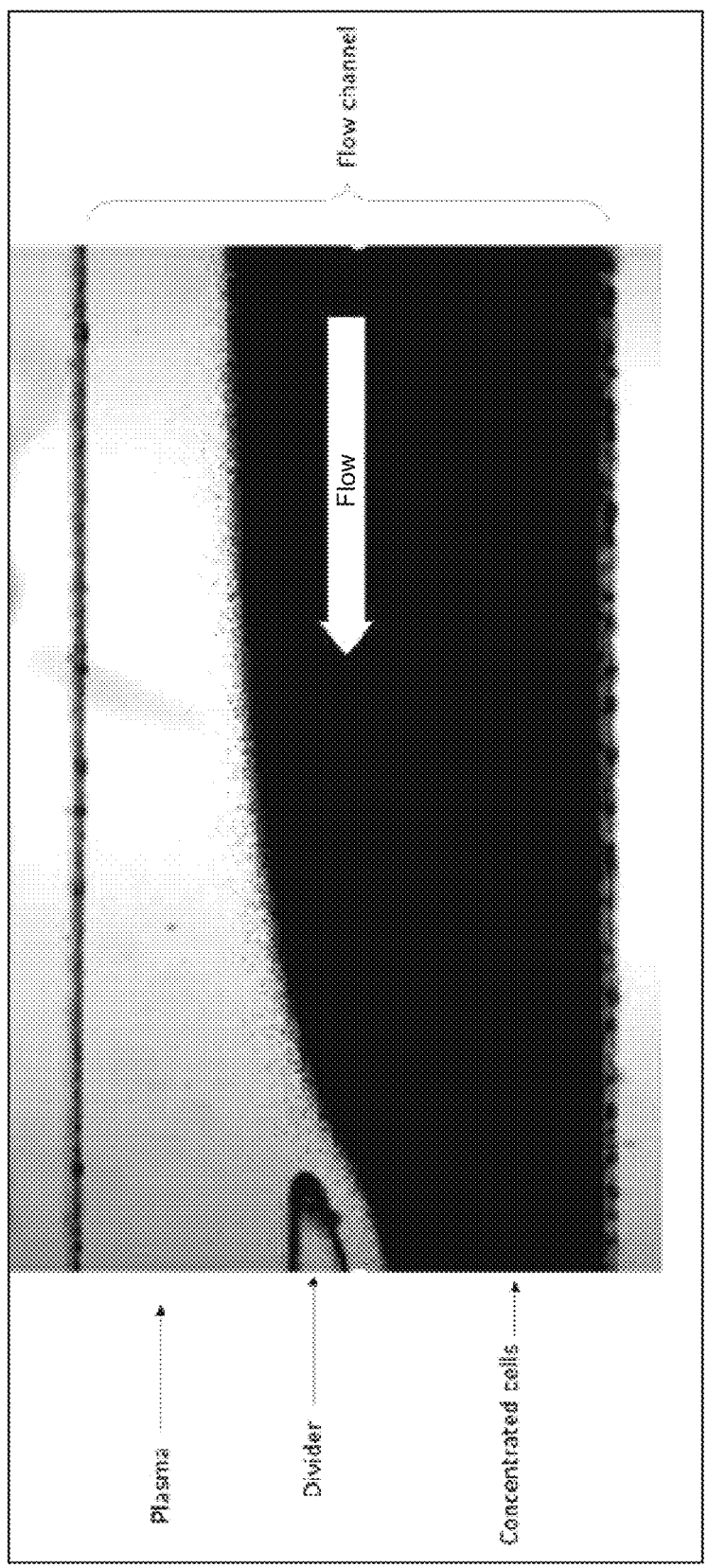
FIG. 17 is a micrograph of isolation of blood cells from a blood sample performed by an embodiment of a particle concentrating and isolating device as described herein.

In an embodiment of the methods according to FIG. 16, gas bubble or immiscible droplet (1601) is introduced following entry of the sample medium into the processing channel. The bubble or droplet is flowed posterior to the sample medium in the processing channel to substantially flush remaining particle enriched layer and particle depleted layer from the processing channel into the outlet channels. This allows for substantially complete isolation of sample fractions and provides for processing of discrete samples or fractions of samples. The frequency of introduction of air can be adjusted to break a large initial sample volume into smaller units for more efficient processing.

An embodiment of the methods of the present invention is a method of fractionating a blood sample comprising providing a whole blood sample or diluted blood sample, and subjecting the sample to a sample concentration method as described herein and isolating plasma and/or blood cells from a whole or diluted blood sample. The blood sample may be a whole or diluted sample from a peripheral blood sample, umbilical cord blood sample, fetal blood sample, or arterial blood sample with a volume of from about 50 µL to about 50 mL, 50 µL to about 20 mL, 50 µL to about 10 mL, or about 50 µL to about 5 mL. In accordance with the method, the separated plasma fraction may contain less than about 1% to less than about 0.01% of the blood cells in the blood sample or be substantially free of blood cells. The isolated blood sample fractions may be used in a diagnostic assay such as an enzyme immunoassay, chemiluminescent immunoassay, hemagglutination/particle agglutination assay, nucleic acid amplification technology assay, a drug assay, a forensic assay, or a genetic trait assay.

As an example of blood cell concentration/plasma separation, a cord blood sample was fractionated into plasma and cellular fractions in a particle concentrating device and method of the present invention. A (10 mL) blood sample was obtained and paramagnetic medium of gadobutrol to obtain a final concentration of 100 mM was added. A total sample volume of 500 microliters was introduced through the inlet channel of a processing channel configured with single magnet component substantially aligned along the X-axis of the top of the processing channel (dimensions X×Y×Z 50×1.9×1 mm), allowed approximately 5 minutes for equilibration, and then flowed at a starting flow rate of 20 microliters per minute. The combined flow rate of 20 microliters per minute comprised 10 microliters per minute flowing to the bottom collection channel and 10 microliters per minute flowing to the top collection channel. After monitoring separation using live imaging, the flow rate was increased to 50 microliters per minute and then to 100 microliters per minute. The ratio of flow rates into the top collection channel and bottom collection channel respectively was adjusted from 1:1 to 4:1 and then an asymmetry in excess of 10:1 (with 10 being to the bottom collection channel, and 1 being to the top collection channel) to draw a higher proportion of the fluid into the bottom channel, and thereby maintain high purity. Concentration of the blood cell enriched layer occurred into the bottom layer of the flow stream and collection was performed through the bottom outlet channel. FIG. 16 is a micrograph (scale: the flow channel height is 1.9 mm) of the processing channel at the anterior region and the sample splitter showing substantial concentration and isolation of the lower blood cell layer and upper plasma layer.

VI. Flowcell Cartridge

Precision, accuracy, and reproducibility are requirements scientific apparatus. Additional considerations include ease of use and manufacturability. The flowcell of the present invention has all of the required hallmarks of usable device which enable scientific experimentation and development that has been either impossible or sometimes only achievable by lengthy and/or complex and costly procedures.

A flowcell cartridge of the present invention comprises a planar substrate comprising an upper surface and a lower surface, a first longitudinal side forming an imaging surface, a second longitudinal side forming an illumination surface, and a first and second transverse side, an inlet well on an upper surface, an inlet channel, a sample processing channel in fluidic communication with the inlet channel and positioned substantially parallel to a longitudinal side, a sample splitter within the processing channel, a plurality of outlet channels in fluidic communication with the processing channel, and a plurality of collection wells in fluidic communication with each of the plurality of outlet channels wherein the substrate optionally comprises an optically transparent material and wherein the processing channel is offset within the plane of the of the substrate to be spatially biased to the imaging surface. The planar configuration allows for all required flowcell functions to be integrated into the cartridge and increases performance and reproducibility in a laboratory or clinical setting. In operation, it is critical for enhanced performance that the flow the processing channel and into the outlet channel be as free of turbulence as possible. Effects of the differences in compressibility between air and liquid, channel configurations that may restrict flow, interact with sample solution meniscus or otherwise induce turbulent flow will reduce performance of particle separations. Minimization of flow conditions of a sample prior to entry into a processing channel can reduce sample loss and reduce opportunity for sample adherence and/or particle clumping within the channels of the flowcell as well as effects of sample handling on the viability of sample cells or organisms. The features of the present invention minimize these and other effects to improve performance and reproducibility. Where imaging within the flowcell is desired, the planar substrate comprises an optically transparent material. Glass, plastic, or polymer materials including cyclic olefin polymer (COP) or cyclic olefin copolymer (COC) are compatible for this application requirement. COP or COP can be utilized through precision injection molding. Other materials can be utilized that can form the cartridge through injection molding, etching, laser oblation, machining, or 3D printing. Typical dimensions of the planar substrate can be at least 50 mm in length, 20 mm in width, and at least 1.5 mm in thickness. Optional ranges are at least 100 mm in length, 35 mm in width, and about 2 to about 6 mm in thickness. The longitudinal sides of the cartridge act as waveguides for illumination and imaging. For that reason, the processing channel is offset in the plane of the substrate and is parallel and adjacent to the imaging longitudinal side of the substrate. Distances from the imaging side wall can be from about 0.5 mm to about 10 mm, preferably from about 0.5 mm to about 5 mm, optionally from about 1 mm to about 3.5 mm. In an embodiment the processing channel spacing from the imaging wall is about 2 mm. Channel dimensions for the processing channel can be any of the embodiments described previously herein. The volume of the processing channel can be configured from about 10 µL to about 800 µL, preferably from about 50 µL to about 600 µL, and optionally 100 µL to about 400 µL or about 150 µL to about 300 µL. In some embodiments the volume is at least about 150 µL, at least about 200 µL, at least about 250 µL, or at least about 300 µL. The combined volume of the outlet channels must be greater that the volume of the processing channel. The flow volume split between two outlet channels can be an even split or can range from about 4:1 to about 1:4, about 3:1 to about 1:3 or about 2:1 to about 1:2 or can vary from 1:1 by about 50% or less, or about 40% or less, or about 30% or less, or about 15% or less when in operation in the system embodiments.

The flowcell of the present invention optionally includes collection wells on the planar substrate. The collection wells feature an inlet that is in fluidic communication with the outlet channel wherein the inlet is at a first well height and is configured with a step transitioning from the inlet port aperture to the floor of the well. The provides a transition surface for the flow of sample fraction into the well and can inhibit back siphoning of the sample fraction into the outlet channel and bubble formation within the collection well. An outlet channel within the collection well is provided with an opening that is at a height off the floor of the collection well that is higher than the opening of the inlet channel. The internal outlet can is placed in communication with a flow modulator, in some instances the flow modulator is an individual pump to provide flow through the flowcell. In operation, the collection well is sealed with a layer of material or film to provide an enclosed system to allow flow or pumping of sample and sample fractions through the flowcell. In assembling the flowcell layers and when an adhesive is used, it is important to provide a biocompatible adhesive. Correct adhesive selection is necessary to minimize or prevent leaching of adhesive components into the solution, adhering to cells or binding molecules from solution, being autofluorescent, having texture which increases the surface area and hence the impact on cells, and overly hydrophilic or hydrophobic. A preferred adhesive is a silicone or silicone-based adhesive.

VII. Cell Separation System

A cell separation system of the present invention comprises a receiving block for retaining a flowcell cartridge, an optical system comprising an optical sensor, a lens, and an illumination source, and plurality of flow modulation components, wherein the receiving block removably places the flowcell cartridge in optical alignment with the optical system, removably engages a magnetic component adjacent to the processing channel of the flow cell, and removably places a plurality of outlet channels of the flowcell cartridge in fluidic communication with the plurality of flow modulation components. The optical is constructed to provide microscopic imaging of the processing channel of the above described flowcell cartridge. Optionally, the optical system is constructed and arranged to provide imaging for florescence emission with optional ultraviolet light exciter modules. The optical system may comprise a source of visible optical illumination constructed and arranged to provide light transmission through the processing channel within the planar substrate. The receiving block is constructed and arranged to hold the planar flowcell cartridge in an orientation to the optical system such that the imaging optics are aligned with the imaging side of the planar cartridge and the visible light emitter is in an orientation to illuminate the illumination side of the planar flowcell cartridge. Optionally, the optical system can further comprise one or more sources of ultraviolet illumination constructed and arranged to place the ultraviolet illumination, optionally at wavelengths of about 474 nm and/or 560 nm, in an angular orientation the imaging side of the planar cartridge to excite fluorophores within the processing channel for the cartridge.

For imaging of fluorescent entities internal to the processing channel optical system optionally comprises a dual bandpass filter preferably passing emitted radiation in bands centered at wavelengths at about 524 nm and 628 nm.

An optional feature of the receiving block is a series of flow modulator adapters that interface with outlets on the top or bottom of the flowcell cartridge. The adapters facilitate fluidic communication with flow modulators, such as a pump in the system, with outlet channels of the flow cells such as the collection well outlet channels. Once the flowcell cartridge is inserted into the receiving block, the receiving block is mechanically actuated to support the cartridge, aligning the illumination and imaging sides of the planar cartridge with the optical imaging system, align the magnetic components to the position them above and below the flowcell processing channel, and, where desired, place the flow modulator adapters in fluidic communication with corresponding outlet channels of the flowcell cartridge.

The flow modulators of the system provide flow to the sample and sample fractions within the flowcell cartridge. The flow rate provided by the flow modulators can range from as low as 1 μL per minute to as high as 1 mL per minute during separations. The flow rate can at or at least about 25 μL per minute, at or at least about 50 μL per minute, at or at least about 100 μL per minute, at or at least about 200 μL per minute, at or at least about 250 μL per minute, at or at least about 300 μL per minute, or from about 300 μL per minute to about 1 mL per minute. The total sample volume flowrate can be about 50 μL/min, about 75 μL/min, about 100 μL/min, about 150 μL/min, about 200 μL/min or about 300 μL/min. The flow volume split between two outlet channels can be an even split or can range from about 4:1 to about 1:4, about 3:1 to about 1:3 or about 2:1 to about 1:2 or can vary from 1:1 by by about 50% or less, or about 40% or less, or about 30% or less, or about 15% or less when in operation in the system embodiments.

The magnetic components of the system may comprise materials, sizes, and strengths as described above and may be placed in configurations as described above and below.

VIII. Live-Dead Cell Separation

The method for separation of a mixture of live cells and dead cells comprises providing flowcell cartridge such as the flowcell cartridges of the embodiments above, comprising a processing channel, and a plurality of outlet channels wherein the combined volume of the outlet channels of the flowcell cartridge is a volume greater than the processing channel, flowing a sample solution comprising live cells and dead cells and a paramagnetic compound into the processing channel, placing the flowcell cartridge in a magnetic field substantially aligned parallel to the processing channel, maintaining the processing channel and the sample contained therein entirely within the magnetic field in a stopped flow condition for a period of time sufficient to separate live cells and dead cells by a vertical distance within the processing channel, simultaneously withdraw a sample fraction enriched with live cells and a sample fraction enriched with dead cells into the outlet channels. Optionally the method further comprises providing a flowcell cartridge that is substantially free of any liquid or paramagnetic compound prior to introduction of the sample solution.

The flowcell cartridge used in the methods of this invention may comprise outlet channels have a cross sectional area less than the cross sectional area of the processing channel and are arranged to follow compacted paths, one exemplary configuration being a serpentine channel. The magnetic field is placed in close proximity to the top vertical surface of the processing channel and in close proximity to the bottom vertical surface of the processing channel, each magnetic field have similar strength and surface field strength of between about 0.5 Tesla and about 2.0 Tesla and optionally between about 0.9 Tesla and about 1 Tesla. The surface field strength may be about 0.5 Tesla, about 0.6 Tesla, about 0.7 Tesla, about 0.8 Tesla, about 0.9 Tesla, or about 1.0 Tesla.

The method may further comprise providing a paramagnetic compound in the sample solution at a concentration of from about 50 mM to about 200 mM, optionally from about 65 mM to about 175 mM, and further optionally from about 70 mM to about 150 mM. The concentration may be about 70 mM, about 75 mM, about 80 mM, about, 90 mM, about 100 mM, about 110 mM, about 120 mM, about 130 mM about 140 mM, about 150 mM, about 160 mM, about 170 mM, about 180 mM, about 190 mM, or about 200 mM.

The method may further comprise the step of withdrawing the sample fractions into the outlet channels at a flow rate of from about 75 μL per minute to about 150 μL per minute, and optionally at about 75 μL per minute, about 90 μL per minute, about 100 μL per minute, about 110 μL per minute, about 120 μL per minute, or about 150 μL per minute.

The method produces exceptional recovery and purity of live cell fractions. The enriched recovered sample fraction comprises at least about 60%, at least about 70%, at least about 80% or at least about 90% live cells and the yield of live cells in the enriched recovered sample fraction is at least about 50%, at least about 60%, at least about 70%, or at least about 75% of the total live cell composition of the sample.

Figure 25A:
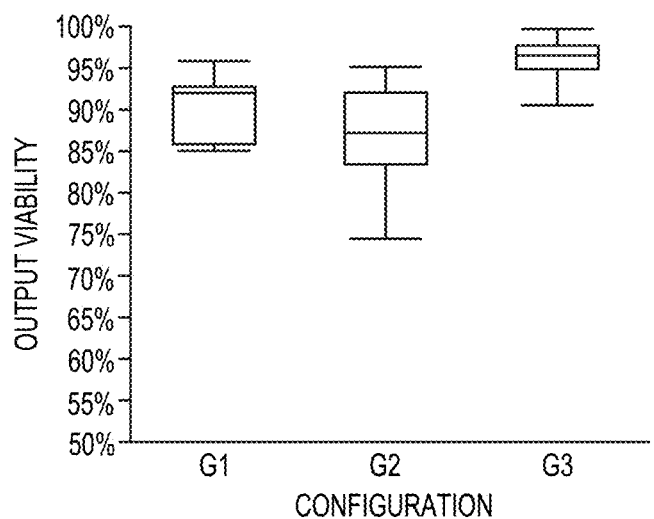
FIGS. 25A-25B show examples of collected cell viability and live cell yield.
Figure 25B:
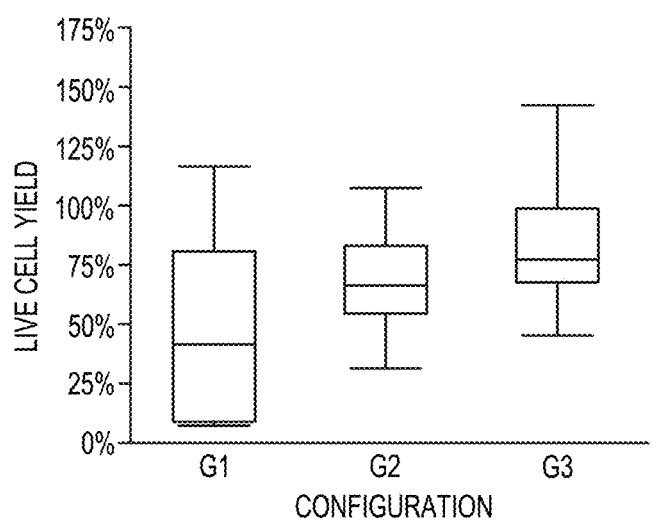
Figure 26A:
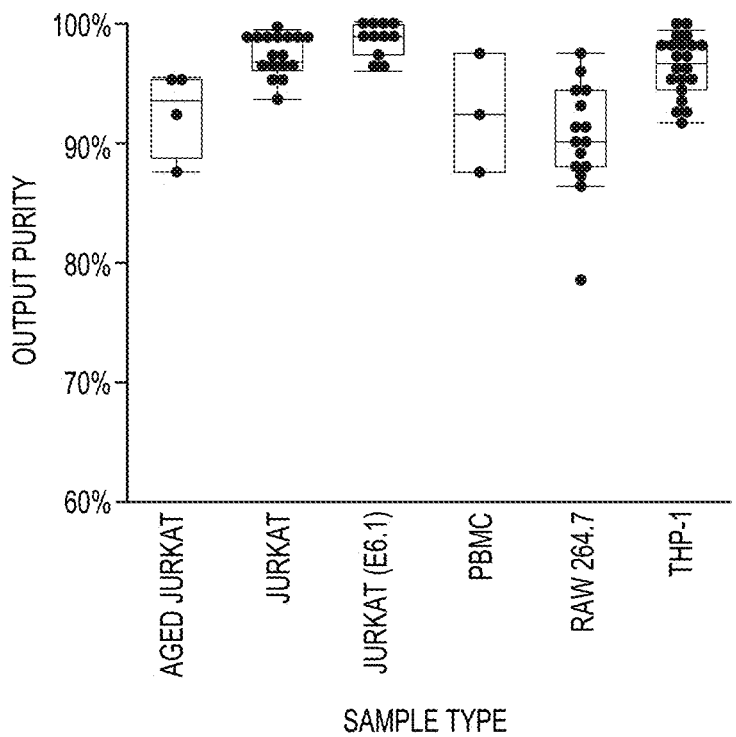
FIGS. 26A-26B show examples of collected live cell purity and yield for various cell types.
Figure 26B:
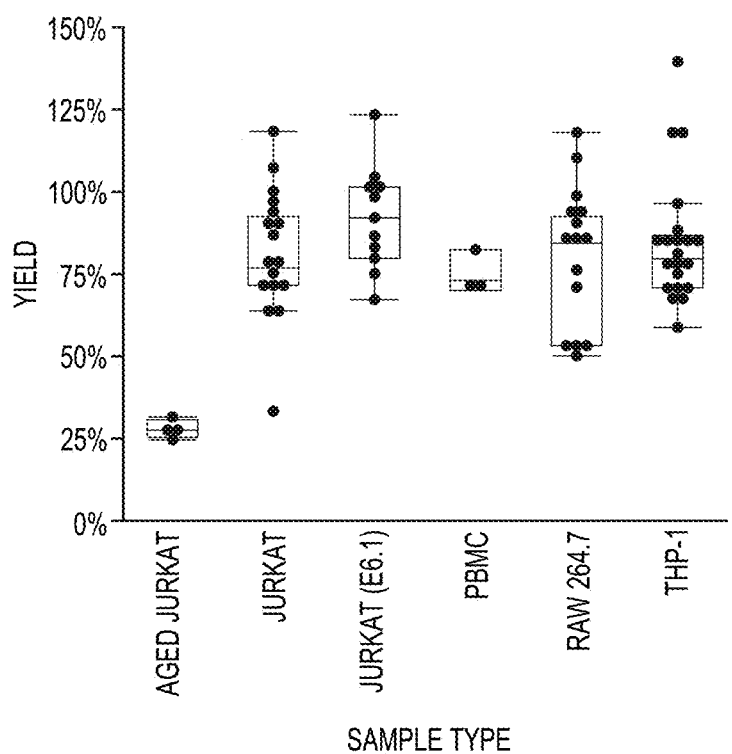

Experiments were performed to separate live and dead Jurkat cells on different instrument with different flowcell configurations. A population of dead Jurkat cells was created by treating fresh Jurkat cells with 70% ethanol. After removing the ethanol and washing the dead cells in media, a mixed population was created by mixing the dead cells back into the original live cell population. The concentration of dead cells was approximately 20% in this final mixture. Aliquots of the cell mixture were separated using the flowcells and systems as described herein using conditions optimized for each instrument configuration. FIGS. 25A and 25B show live cell fraction viability and live cell yield obtained by the method described herein. The ability to provide efficient live cell separations on a variety of cell types by the methods described herein is demonstrated in FIGS. 2A and 26B. Live cell separation and enrichment has been performed on primary cell, primary cells isolated from human and animal tissue, dissociated cells from tumors, cultured cells, and other cells as described herein.

IX Disclosed Embodiments are Non-Limiting

While various embodiments of the present invention have been shown and described herein, it is emphasized that such embodiments are provided by way of example only. Numerous variations, changes and substitutions may be made without departing from the invention herein in its various embodiments. Specifically, when any range is described herein, unless clearly stated otherwise, that range includes all values therein and all subranges therein.

Also, and more generally, in accordance with disclosures, discussions, examples and embodiments herein, there may be employed conventional fluidics, molecular biology, cellular biology, microbiology, and recombinant DNA techniques within the skill of the art. Resources incorporated by reference herein are for their respective content and teachings found therein. Such incorporation, at a minimum, is for the specific teaching and/or other purpose that may be noted when citing the reference herein. If a specific teaching and/or other purpose is not so noted, then the published resource is specifically incorporated for the teaching(s) indicated by one or more of the title, abstract, and/or summary of the reference. If no such specifically identified teaching and/or other purpose may be so relevant, then the published resource is incorporated in order to more fully describe the state of the art to which the present invention pertains, and/or to provide such teachings as are generally known to those skilled in the art, as may be applicable. However, it is specifically stated that a citation of a published resource herein shall not be construed as an admission that such is prior art to the present invention. Also, in the event that one or more of the incorporated published resources differs from or contradicts this application, including but not limited to defined terms, term usage, described techniques, or the like, this application controls as a preferred embodiment, and any contradiction may be viewed as an alternative embodiment.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A method for separation of a mixture of live cells and dead cells comprising:
    providing a flowcell cartridge comprising a processing channel, and a plurality of outlet channels, wherein said processing channel has a top vertical surface and a bottom vertical surface;
    flowing a sample solution comprising live cells and dead cells and a paramagnetic compound into the processing channel;
    placing the flowcell cartridge in a magnetic field substantially aligned parallel to the processing channel;
    maintaining the processing channel and the sample solution contained therein entirely within the magnetic field in a stopped flow condition for a period of time sufficient to separate live cells and dead cells by a vertical distance within the processing channel; and
    simultaneously withdrawing a sample fraction enriched with live cells and a sample fraction enriched with dead cells into the outlet channels;
    wherein the paramagnetic compound is dissolved in solution and is present in an amount of from about 50 mM to about 200 mM.

2. The method of claim 1, wherein the flowcell cartridge is substantially free of any liquid or paramagnetic compound prior to introduction of the sample solution.

3. The method of claim 1, wherein the flowcell cartridge outlet channels have a cross sectional area less than the cross sectional area of the processing channel; said method optionally further comprising providing a second magnetic field, wherein one of said magnetic fields is in close proximity to the top vertical surface of the processing channel and the other magnetic field is in close proximity to the bottom vertical surface of the processing channel, wherein each magnetic field has similar strength and surface field strength of between about 0.8 Tesla and about 2.0 Tesla.

4. The method of claim 2, wherein the outlet channels have a cross sectional area less than the cross sectional area of the processing channel; said method optionally further comprising providing a second magnetic field, wherein one of said magnetic fields is in close proximity to the top vertical surface of the processing channel and the other magnetic field is in close proximity to the bottom vertical surface of the processing channel, wherein each magnetic field has similar strength and surface field strength of between about 0.8 Tesla and about 2.0.

5. The method of claim 3, wherein the paramagnetic compound in the sample solution has a concentration of from about 70 mM to about 150 mM; and optionally further comprising withdrawing the sample fractions into the outlet channels at a flow rate of from about 75 µL per minute to about 150 µL per minute.

6. The method of claim 4, wherein the paramagnetic compound in the sample solution has a concentration of from about 70 mM to about 150 mM; and optionally further comprising withdrawing the sample fractions into the outlet channels at a flow rate of from about 75 µL per minute to about 150 µL per minute.

7. The method of claim 3, wherein the enriched recovered sample fraction comprises at least about 60% live cells.

8. The method of claim 4, wherein the enriched recovered sample fraction comprises at least about 60% live cells.

9. The method of claim 3, wherein the yield of live cells in the enriched recovered sample fraction is at least about 50% of the total live cell composition of the sample.

10. The method of claim 4, wherein the yield of live cells in the enriched recovered sample fraction is at least about 50% of the total live cell composition of the sample.

11. The method of claim 1, wherein the outlet channels of the flowcell cartridge have a volume greater than the processing channel.

12. The method of claim 3, wherein the outlet channels are arranged to follow a serpentine path.

13. The method of claim 3, wherein each magnetic field has a surface field strength of between about 0.9 Tesla and about 1.4 Tesla.

14. The method of claim 4, wherein the outlet channels are arranged to follow a serpentine path.

15. The method of claim 4, wherein each magnetic field has a surface field strength of between about 0.9 Tesla and about 1.4 Tesla.

16. The method of claim 7, wherein the enriched recovered sample fraction comprises at least about 70% live cells.

17. The method of claim 7, wherein the enriched recovered sample fraction comprises at least about 80% live cells.

18. The method of claim 7, wherein the enriched recovered sample fraction comprises at least about 90% live cells.

19. The method of claim 8, wherein the enriched recovered sample fraction comprises at least about 70% live cells.

20. The method of claim 8, wherein the enriched recovered sample fraction comprises at least about 80% live cells.

21. The method of claim 8, wherein the enriched recovered sample fraction comprises at least about 90% live cells.

22. The method of claim 9, wherein the yield of live cells in the enriched recovered sample fraction is at least about 60% of the total live cell composition of the sample.

23. The method of claim 9, wherein the yield of live cells in the enriched recovered sample fraction is at least about 75% of the total live cell composition of the sample.

24. The method of claim 10, wherein the yield of live cells in the enriched recovered sample fraction is at least about 60% of the total live cell composition of the sample.

25. The method of claim 10, wherein the yield of live cells in the enriched recovered sample fraction is at least about 75% of the total live cell composition of the sample.

* * * * *